US 8,625,177 B2

(12) United States Patent
Minami et al.

(10) Patent No.: US 8,625,177 B2
(45) Date of Patent: Jan. 7, 2014

(54) IMAGE PROCESSING APPARATUS, IMAGE FORMING APPARATUS, IMAGE PROCESSING METHOD, AND STORAGE MEDIUM, EACH OF WHICH PERFORMS, ON MONOCHROME IMAGE DATA TO IMAGE DISPLAY DEVICE, OR TWO-COLOR IMAGE DATA, COLOR MATCHING PROCESS OF REDUCING DIFFERENCES IN COLOR BETWEEN IMAGE TO BE OUTPUTTED BY IMAGE DISPLAY DEVICE AND IMAGE TO BE OUTPUTTED BY PRINTING APPARATUS

(75) Inventors: Masanori Minami, Osaka (JP); Makio Gotoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 238 days.

(21) Appl. No.: 12/547,624

(22) Filed: Aug. 26, 2009

(65) Prior Publication Data
US 2010/0053709 A1 Mar. 4, 2010

(30) Foreign Application Priority Data

Aug. 27, 2008 (JP) ................................. 2008-218835

(51) Int. Cl.
*G03F 3/08* (2006.01)
(52) U.S. Cl.
USPC ............ 358/518; 358/1.9; 358/515; 358/520; 358/527; 382/162; 382/167; 345/590; 345/600; 345/603; 345/604
(58) Field of Classification Search
None
See application file for complete search history.

(56) References Cited

U.S. PATENT DOCUMENTS

| 5,566,001 | A | 10/1996 | Saidi et al. |
| 5,946,412 | A * | 8/1999 | Nishikawa ................... 382/162 |
| 5,987,221 | A | 11/1999 | Bearss et al. |
| 6,037,939 | A | 3/2000 | Kashiwagi et al. |
| 6,204,932 | B1 * | 3/2001 | Haneda et al. ................. 358/1.9 |
| 6,839,151 | B1 | 1/2005 | Andree et al. |
| 6,934,054 | B1 * | 8/2005 | Hilsdorf et al. ................ 358/1.9 |
| 7,085,006 | B2 | 8/2006 | Yokoyama et al. |
| 2002/0167528 | A1 | 11/2002 | Edge |
| 2003/0044082 | A1 | 3/2003 | Katayama et al. |

(Continued)

FOREIGN PATENT DOCUMENTS

| CN | 1498494 A | 5/2004 |
| CN | 1669313 A | 9/2005 |

(Continued)

OTHER PUBLICATIONS

US Office Action for U.S. Appl. No. 12/583,807 mailed Jul. 8, 2011.

(Continued)

*Primary Examiner* — Miya J Cato
(74) *Attorney, Agent, or Firm* — Birch, Stewart, Kolasch & Birch, LLP

(57) ABSTRACT

An image processing apparatus of the present invention includes a color matching section for performing, on monochrome or two-color image data to be supplied to an image display device, a color matching process of reducing differences in color from a single- or two-color image to be outputted by an image display device, and as such, can display a comfortable preview of a single- or two-color image data by reducing differences in color between an image to be previewed and an image to be actually printed.

7 Claims, 15 Drawing Sheets

(56) References Cited

U.S. PATENT DOCUMENTS

| | | | |
|---|---|---|---|
| 2004/0125411 A1* | 7/2004 | Tonami et al. | 358/2.1 |
| 2004/0239995 A1* | 12/2004 | Sadowara | 358/2.1 |
| 2005/0041261 A1* | 2/2005 | Narushima et al. | 358/1.9 |
| 2005/0052540 A1 | 3/2005 | Nakami | |
| 2005/0254691 A1 | 11/2005 | Nakami | |
| 2006/0098220 A1 | 5/2006 | Oh et al. | |
| 2006/0158670 A1* | 7/2006 | Park | 358/1.9 |
| 2007/0035706 A1 | 2/2007 | Margulis | |
| 2007/0153316 A1 | 7/2007 | Edge | |
| 2007/0280533 A1 | 12/2007 | Huang | |
| 2008/0001972 A1* | 1/2008 | Callway et al. | 345/660 |
| 2008/0030816 A1 | 2/2008 | Jang | |
| 2008/0231903 A1* | 9/2008 | Misawa et al. | 358/2.1 |
| 2008/0285079 A1 | 11/2008 | Kurakata | |
| 2009/0167872 A1 | 7/2009 | Nakami | |
| 2010/0085445 A1 | 4/2010 | Nakami | |

FOREIGN PATENT DOCUMENTS

| | | |
|---|---|---|
| CN | 101123669 A | 2/2008 |
| JP | 9-44128 A | 2/1997 |
| JP | 9-135316 A | 5/1997 |
| JP | 11-127360 A | 5/1999 |
| JP | 2001-222145 A | 8/2001 |
| JP | 2002-232708 A | 8/2001 |
| JP | 2002-269550 A | 9/2002 |
| JP | 2003-224734 A | 8/2003 |
| JP | 2007-28336 A | 2/2007 |
| JP | 2008-155373 A | 7/2008 |

OTHER PUBLICATIONS

Tanaka et al., "Color Calibration System Using Neural Networks", Apr. 2000, Sharp Technical Journal, No. 76, p. 15-19.

US Office Action for U.S. Appl. No. 12/547,989 mailed Mar. 2, 2012.

US Office Action for U.S. Appl. No. 12/547,965 mailed Jun. 19, 2012.

US Office Action for U.S. Appl. No. 12/547,989 mailed Sep. 6, 2012.

US Office Action for U.S. Appl. No. 12/583,803 mailed Jun. 6, 2012.

US Office Action for related U.S. Appl. No. 12/547,989 mailed Mar. 1, 2013.

US Office Action for related U.S. Appl. No. 12/583,803 mailed Mar. 25, 2013.

U.S. Office Action for related U.S. Appl. No. 12/547,557 mailed Dec. 21, 2012.

U.S. Final Office Action for related U.S. Appl. No. 12/583,803 mailed Dec. 3, 2012.

US Advisory Action for related U.S. Appl. No. 12/583,803 mailed Feb. 8, 2013.

US Office Action, for U.S. Appl. No. 12/754,398 dated Jun. 6, 2013.

U.S. Office Action mailed Jul. 5, 2013 in related U.S. Appl. No. 12/583,803.

US Office Action for related U.S. Appl. No. 12/547,557 mailed Jun. 14, 2013.

US Final Office Action for U.S. Appl. No. 12/547,989 mailed Sep. 13, 2013.

* cited by examiner (a)

(b)

(a)

(b)

(c)

(a)

(b)

(c)

IMAGE PROCESSING APPARATUS, IMAGE FORMING APPARATUS, IMAGE PROCESSING METHOD, AND STORAGE MEDIUM, EACH OF WHICH PERFORMS, ON MONOCHROME IMAGE DATA TO IMAGE DISPLAY DEVICE, OR TWO-COLOR IMAGE DATA, COLOR MATCHING PROCESS OF REDUCING DIFFERENCES IN COLOR BETWEEN IMAGE TO BE OUTPUTTED BY IMAGE DISPLAY DEVICE AND IMAGE TO BE OUTPUTTED BY PRINTING APPARATUS

This Nonprovisional application claims priority under 35 U.S.C. §119(a) on Patent Application No. 2008-218835 filed in Japan on Aug. 27, 2008, the entire contents of which are hereby incorporated by reference.

TECHNICAL FIELD

The present invention relates to an image processing apparatus, an image forming apparatus, an image processing method, and a computer-readable storage medium containing an image processing program, each of which serves to display a thumbnail or preview of input image data.

BACKGROUND ART

Some image forming apparatuses such as copying machines and multifunction printers display, in accordance with image data processed according to the type of document and the setting conditions (e.g., print density, enlarging/reducing ratio, single-side printing/duplex printing, margin size), a preview of a single image to be printed or a combination of images to be printed.

Such a preview display is described, for example, in Patent Literature 1. In Patent Literature 1, a monochrome mode in which to copy a monochrome image having only one color (i.e., a black-and-white image such as a document or a monochrome image, such as a flier (leaflet), which has one color) and a full-color mode in which to copy a full-color image having at least two colors are included, and before an image to be copied in the monochrome mode and the full-color mode is recorded onto a sheet of paper, a preview of the image is displayed by a display device.

Further, for example, Patent Literature 2 discloses a technique for generating and displaying a preview image without performing edge enhancement on image data. In Patent Literature 2, RGB luminance signals read by a scanner are converted into CMY density (pixel value) signals by a logarithmic converter circuit. The resulting CMY density signals are processed through a masking/UCR circuit so as to be color-matched to the characteristics of a printer, processed by a circuit for performing image editing such as trimming, painting and enlarging/reducing (zooming) and a spatial filter circuit for performing a smoothing process on a printed-picture document, and then processed by a backward masking circuit for performing a conversion opposite to that performed by the masking/UCR circuit, an anti-logarithmic converter circuit for restoring the CMY density signals to the RGB luminance signals, a 3×3 matrix converter circuit for converting the RGB image signals from the color space of the scanner into the color space of the display device, and a gamma correction circuit for correcting the nonlinearity of the display device, whereby the preview of the image data is displayed by the display device.

CITATION LIST

Patent Literature 1

Japanese Patent Application Publication, Tokukai, No. 2001-222145 A (Publication Date: Aug. 17, 2001)

Patent Literature 2

Japanese Patent Application Publication, Tokukaihei, No. 9-135316 A (Publication Date: May 20, 1997)

SUMMARY OF INVENTION

Technical Problem

Patent Literature 1 describes a preview of a monochrome image, but does not describe a correction process in displaying monochrome image data on the display device. This causes a mismatch in color between an image to be printed and an image to be displayed by the display device. Further, Patent Literature 2 does not describe a single- or two-color display of read image data, but when displaying a single- or two-color preview, Patent Literature 2 encounters the following problems (1) and (2):

(1) although Patent Literature 2 describes the masking/UCR circuit, which generates CMYK signals by 4×8 matrix calculation in consideration of terms of second degree, and the backward masking circuit, which performs a reverse conversion by 3×4 matrix calculation, such a method causes an increase in color difference, thus causing a mismatch in color between an image to be printed and an image to be displayed by the display device; and (2) the backward masking circuit, the anti-logarithmic converter circuit, and the 3×3 matrix converter circuit are provided as image processing circuits for previewing separately from image processing circuits for printing, thus causing an increase in circuit size.

As described above, in single- or two-color printing, the conventional techniques result in differences in color between an image to be displayed for previewing and an image to be actually printed thus causing an increase in circuit size.

Solution to Problem

The present invention has been made in view of the foregoing problems, and it is an object of the present invention to provide an image processing apparatus and the like capable of displaying a comfortable preview of a single- or two-color image by reducing differences in color between an image to be displayed for previewing and an image to be actually printed.

In order to solve the foregoing problems, an image processing apparatus according to the present invention is an image processing apparatus, having a color conversion section for converting image data into monochrome image data, which supplies the monochrome image data to a printing apparatus for executing image printing and supplies the monochrome image data to an image display device for displaying a preview, the image processing apparatus including: a color matching section for performing, on the monochrome image data to be supplied to the image display device, a color matching process of reducing differences in color between an image to be outputted by the image display device and an image to be outputted by the printing apparatus.

In order to solve the foregoing problems, an image processing apparatus according to the present invention is an image processing apparatus, having a color conversion section for converting image data into two-color image data, which supplies the two-color image data to a printing apparatus for executing image printing and supplies the two-color image data to an image display device for displaying a preview, the image processing apparatus including: a color matching section for performing, on the two-color image data to be supplied to the image display device, a color matching process of reducing differences in color between an image to be outputted by the image display device and an image to be outputted by the printing apparatus.

In order to solve the foregoing problems, an image processing apparatus according to the present invention is an image processing apparatus, including a first color conversion section for converting image data into monochrome converted image data and a second color conversion section for converting the image data into two-color converted image data, which supplies, to a printing apparatus for executing image printing, the converted image data converted by the first or second color conversion section, and which supplies, to an image display device for displaying a preview, the converted image data converted by the first or second color conversion section, the image processing apparatus including: a color matching section for performing, on the converted image data to be supplied to the image display device, a color matching process of reducing differences in color between an image to be outputted by the image display device and an image to be outputted by the printing apparatus.

Advantageous Effects of Invention

According to the foregoing arrangement, a monochrome image or a two-color image can be printed by supplying the monochrome image data or the two-color image data (converted image data) to the printing apparatus, and a preview of the monochrome image or the two-color image can be displayed by supplying the monochrome image data or the two-color image data to the image display device. Here, on the monochrome image data or the two-color image data to be supplied to the image display device, the color matching process of reducing differences in color between an image to be outputted by the image display device and an image to be outputted by the printing apparatus is performed. This makes it possible to display a comfortable preview of a monochrome image or a two-color image by reducing differences in color between an image to be previewed and an image to be actually printed.

For a fuller understanding of the nature and advantages of the invention, reference should be made to the ensuing detailed description taken in conjunction with the accompanying drawings.

DESCRIPTION OF EMBODIMENTS

Embodiment 1

Figure 1:
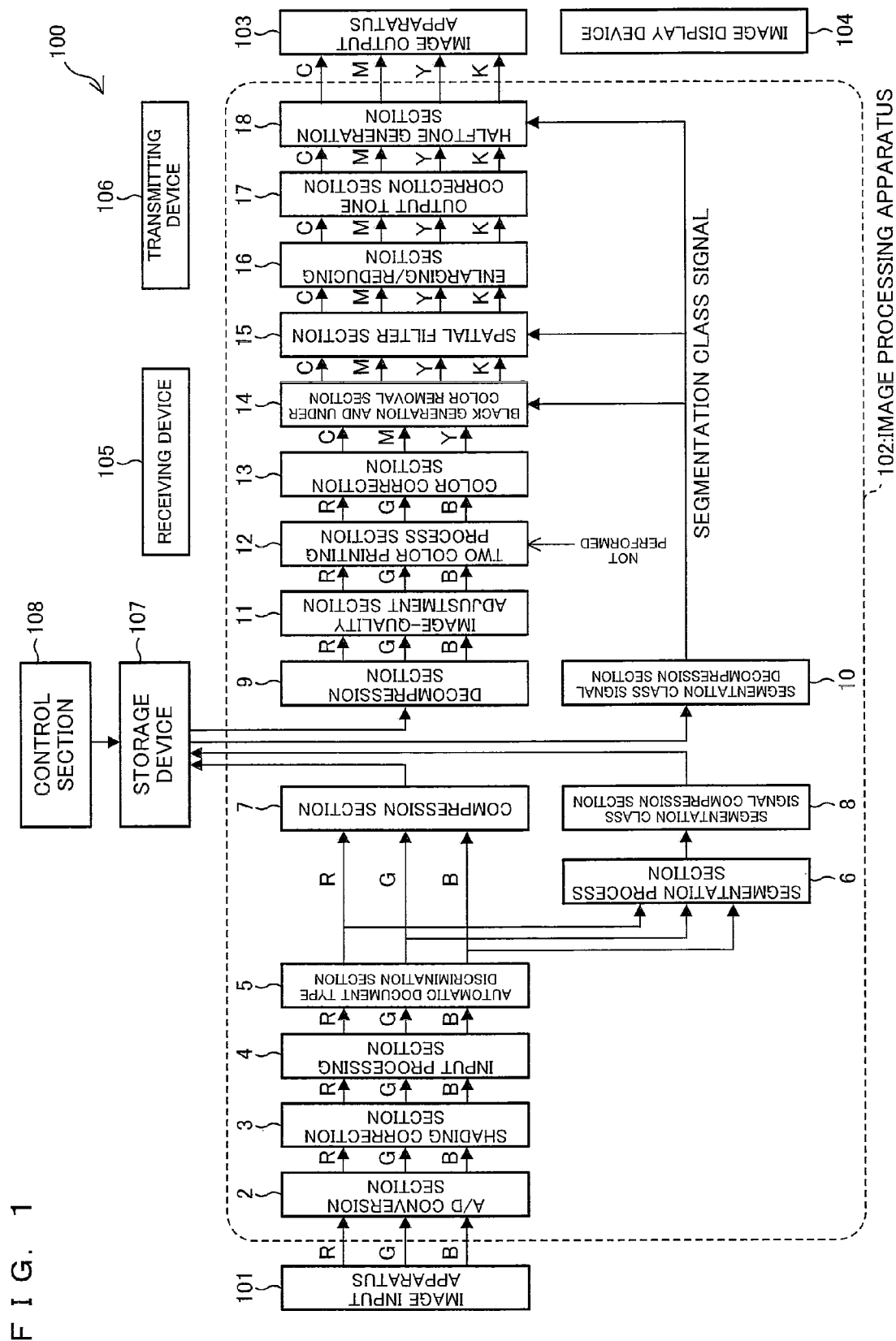
FIG. 1 is a block diagram showing an image forming apparatus of the present embodiment and showing the flow of image data in a printing process in a copier mode and a full-color mode.

One embodiment of an image forming apparatus of the present invention is described below with reference to the attached drawings. FIG. 1 is a block diagram schematically showing an arrangement of an image forming apparatus 100 of the present embodiment.

The image forming apparatus 100 of the present embodiment is a digital color multifunction printer that executes a mode selected from among a copier mode, a print mode, a facsimile transmission mode, a facsimile reception mode, and an image transmission mode.

The copier mode (copy mode) means a mode in which to read image data (generates image data by scanning a document) and print an image of the image data onto a sheet of paper. The print mode means a mode in which to print, onto a sheet of paper, an image of image data sent from a terminal apparatus connected to the image forming apparatus 100. The facsimile transmission mode means: a normal facsimile mode in which to transmit, to an external apparatus via a telephone line, image data obtained by scanning a document; and an Internet facsimile mode in which to transmit an e-mail with the image data attached thereto. The facsimile reception mode means a mode in which to receive image data from an external apparatus by facsimile and print an image of the received image data onto a sheet of paper. The image transmission mode means: (1) a mode (scan to e-mail mode) in which to attach, to an e-mail, image data generated by scanning a document, and transmit the e-mail to a specified address; (2) a mode (scan to ftp mode) in which to transmit, to a folder specified by a user, image data generated by scanning a document; and (3) a mode (scan to usb mode) in which to transmit, to a USB memory mounted in the image forming apparatus 100, image data generated by scanning a document. It should be noted that the facsimile transmission mode and the image transmission mode are each classified as above according to the type of image processing operation.

Further, in the copier mode or print mode, the user can select a black-and-white mode in which to output a black-and-white image, a full-color mode in which to output a full-color mage, a single-color mode in which to output a monochrome image having only one color desired by the user, or a two-color mode in which to output a two-color image having black and one color desired by the user.

For example, in cases where the user selects the single-color mode in the copier mode or print mode, the monochromatic image is printed. Further, in cases where the user selects the two-color mode in the copier mode or print mode, the two-color image is printed. It should be noted that in the single-color mode or two-color mode, the user selects his/her desired color from among R (red), G (green), B (blue), C (cyan), M (magenta), and Y (yellow).

Further, according to the present invention it is possible to set an automatic discrimination mode in the copier mode. In the automatic discrimination mode, the image forming apparatus 100 performs auto color selection (ACS) for judging whether an object to be copied is a color document or a black-and-white document. In the case of a color document, the image forming apparatus 100 performs an output process in the full-color mode. In the case of a black-and-white document, the image forming apparatus 100 performs an output process in the black-and-white mode.

As shown in FIG. 1, the image forming apparatus 100 includes an image input apparatus 101, an image processing apparatus 102, an image output apparatus 103, an image display device 104, a receiving device 105, a transmitting device 106, a storage device 107, and a control section 108.

The image input apparatus 101 is image scanning means for generating image data by scanning a document in the copier mode, the facsimile transmission mode, and the image transmission mode. More specifically, the image input apparatus 101, which includes a scanner section having a CCD (charge-coupled device), converts light reflected by a document into an electrical signal separated into colors RGB (i.e., into an analog image signal) and sends the electrical signal to the image processing apparatus 102.

It should be noted that the image input apparatus 101 scans a document image in full color in any one of the full-color mode, the single-color mode, and the two-color mode. Further, the image input apparatus 101 scans a document image in full color even in cases where the image processing apparatus 102 performs the aforementioned auto color selection.

The image processing apparatus 102 is an integrated circuit, constituted by an ASIC (application specific integrated circuit), which performs image processing on image data (image signals). As shown in FIG. 1, the image processing apparatus 102 includes the following blocks: an A/D (analog/digital) conversion section 2, a shading correction section 3, an input processing section 4, an automatic document type discrimination section 5, a segmentation process section 6, a compression (encode) section 7, a segmentation class signal compression (encode) section 8, a decompression (decode) section 9, a segmentation class signal decompression (decode) section 10, an image-quality adjustment section 11, a two-color printing process section 12, a color correction section 13, a black generation and under color removal section 14, a spatial filter section 15, an enlarging/reducing (zoom process) section 16, an output tone correction section 17, and a halftone generation section 18. Processes that are performed by the blocks of the image processing apparatus 102 will be detailed later.

In the copier mode, facsimile transmission mode, or image transmission mode, the image processing apparatus 102 performs image processing on image data sent from the image input apparatus 101. In the print mode, the image processing apparatus 102 performs image processing on image data transmitted from a terminal apparatus. In the facsimile reception mode, the image processing apparatus 102 performs image processing on image data received from an external apparatus. Then, in the copier mode, print mode, or facsimile reception mode, the image processing apparatus 102 transmits, to the image output apparatus 103, the image data subjected to image processing. In the facsimile transmission mode, the image processing apparatus 102 transmits, to the transmitting device 106, the image data subjected to image processing. Further, in the scan to e-mail mode, which is an image transmission mode, the image processing apparatus 102 transmits, to a mail processing section (not shown), the image data subjected to image processing. In the scan to ftp mode, which is another image transmission mode, the image processing apparatus 102 transmits, to a predetermined folder, the image data subjected to image processing. In the scan to usb mode, which is the other image transmission mode, the image processing apparatus 102 transmits, to a predetermined USB memory, the image data subjected to image processing.

The image output apparatus (printer) 103 forms, onto a recording medium (e.g., a sheet of paper), an image of image data sent from the image processing apparatus 102. An example is an electrophotographic or ink-jet color printer. The term "printing" in the present embodiment means printing in the print mode, printing in the copier mode, or printing in the facsimile reception mode.

The image display device 104 is a liquid crystal display provided in an operation panel (not shown) of the image forming apparatus 100, and is display means capable of displaying a color image. Further, the image display device 104, covered with a touch panel, functions as an input interface of the image forming apparatus 100. That is, the image display device 104 displays a GUI for inputting various commands to the image forming apparatus 100 and an operation guide.

Further, before execution of printing in the copier mode or facsimile reception mode, the image forming apparatus 100 of the present embodiment can display, on the image display device 104, a preview of an image to be printed. Furthermore, before execution of transmission in the facsimile transmission mode or image transmission mode, the image forming apparatus 100 of the present embodiment can display, on the image display device 104, a preview of an image to be transmitted.

Further, in the copier mode or image transmission mode and the full-color mode, the image display device 104 displays a preview of a full-color image. In the copier mode or image transmission mode and the single-color mode, the image display device 104 displays a preview of a monochrome image. In the copier mode or image transmission mode and the two-color mode, the image display device 104 displays a preview of a two-color image.

The image display device 104 is not limited to the liquid crystal display, and may be display means other than the liquid crystal display (e.g., an organic EL display or a plasma display).

The receiving device 105 is a device, connected to a telephone line or the Internet, which receives image data from an external apparatus by facsimile communication. Further, the transmitting device 106 is a device, connected to a telephone line or the Internet, which transmits, to an external apparatus by facsimile communication, image data inputted to the image input apparatus 101.

The storage device 107 is a hard disk in which image data to be processed in the image processing apparatus 102 is temporarily stored.

The control section 108 is a computer including a processor such as a CPU (central processing unit) or a DSP (digital signal processor), and comprehensively controls various types of hardware provided in the image forming apparatus 100. Further, the control section 108 functions to control data transfer between pieces of hardware provided in the image forming apparatus 100.

The following details the processes that are executed by the blocks of the image processing apparatus 102 in the copier mode, the facsimile transmission mode, the facsimile reception mode, and the image transmission mode, respectively. It should be noted that the image processing apparatus 102 of the present embodiment has a block that operates while a mode a is being used but does not operate while a mode b different from the mode a is being used (the mode a and the mode b each being any one of the copier mode, the facsimile transmission mode, the facsimile reception mode, and the image transmission mode). Further, the image processing apparatus 102 has a block that varies in processing according to the mode being used. Furthermore, the image processing apparatus 102 has: a block that, even in the same mode, operates in processing of image data to be printed (transmitted) but does not operate in processing of image data to be previewed; and a block that, even in the same mode, varies between processing of image data to be printed (transmitted) and processing of image data to be previewed. In the following, therefore, the processes that are executed by the blocks of the image processing apparatus 102 are described according to the type of mode, and those processes which are executed in a printing process (or in a transmission process) and those processes which are executed at the time of a preview display are described separately.

(1) Copier Mode (1-1) Printing Process (Image Print Job)

In the following, the image processing apparatus 102 is described with reference to FIG. 1, which shows the flow of image data in the image processing apparatus 102 performing a printing process in the copier mode and the full-color mode.

The A/D (analog/digital) conversion section 2 is a block that receives color image signals (RGB analog signals) from the image input apparatus 101 and converts the color image signals into digital image data (RGB digital signals). The shading correction section 3 is a block that receives image data form the A/D conversion section 2 and subjects the image data to a process of removing various distortions generated in illuminating, image-focusing, and image-sensing systems of the image input apparatus 101. The input processing section 4 is a block that receives RGB image data from the shading correction section 3 and subjects each of the RGB image data to a tone conversion process such as a gamma correction process.

In accordance with RGB image data (RGB density signals) subjected to processing such as gamma correction in the input processing section 4, the automatic document type discrimination section 5 discriminates among types of documents scanned by the image input apparatus 101. It should be noted here that the types of documents among which the automatic document type discrimination section 5 discriminates are a text document, a printed-picture document, a text/printed-picture document containing a text and a printed picture together, and the like. Further, in accordance with the image data, the automatic document type discrimination section 5 can perform auto color selection (ACS) for judging whether a scanned document is a color document or a black-and-white document and a process for judging whether or not a scanned document is a blank document (a solid-color document). It should be noted that the automatic document type discrimination section 5 sends the RGB image data to the segmentation process section 6 and the compression section 7.

In accordance with the RGB image data sent from the automatic document type discrimination section 5, the segmentation process section 6 performs a process of judging, for each pixel of the input image, what image area the pixel is classified into and generating a segmentation class signal indicating a result of the judgment. It should be noted here that the types of image areas among which the segmentation process section 6 discriminates are a black text area, a color text area, a halftone dot area, and the like. The segmentation process may take the form of a process of judging, for each block of pixels, what image area the block is classified into, instead of taking the form of a process of judging, for each pixel, what image area the pixel is classified into.

The compression section 7 is a block that performs a process of encoding image data (RGB signals) sent from the automatic document type discrimination section 5. The encoding is performed, for example, based on JPEG (Joint Photographic Experts Group).

The segmentation class signal compression section 8 is a block that performs a compression (encode) process on a segmentation class signal generated for each pixel. The compression process in the segmentation class signal compression section 8 is performed, for example, based on MMR (Modified Modified Reed) or MR (Modified Reed), which is a lossless compression technology.

The control section 108 receives encoded codes (encoded image data) from the compression section 7 and segmentation class signal codes (encoded segmentation class signals) from the segmentation class signal compression section 8, stores them temporarily in the storage device 107, and manages them as filing data. Then, in response to an instruction for a copy output operation, the control section 108 reads out, from the storage device 107, an encoded code and a segmentation class signal code corresponding to the encoded code, and sends them to the decompression section 9 and the segmentation class signal decompression section 10, respectively.

The control section 108 writes the storage address or data name of the encoded code and the storage address of the segmentation class signal code in a management table in association with each other. That is, the control section 108 controls reading or writing of encoded codes and segmentation class signal codes with reference to the management table.

The decompression section 9 decompresses the encoded code into RGB image data by performing a decompression (decode) process on the encoded code. Further, the segmentation class signal decompression section 10 performs a decompression process on the segmentation class signal code. The resulting segmentation class signal is sent to the black generation and under color removal section 14, the spatial filter section 15, and the halftone generation section 18. Then, the black generation and under color removal section 14, the spatial filter section 15, and the halftone generation section 18 select image processing according to the type of image area.

The image-quality adjustment section 11 receives the RGB image data from the decompression section 9, and performs background removal correction on the RGB image data by detecting a background in the RGB image data. Furthermore, the image-quality adjustment section 11 adjusts RGB balance (color adjustment of red, green, or blue), brightness, and intensity (saturation) in accordance with configuration information inputted by the user from the operation panel (not shown).

Furthermore, in the single-color mode, the image-quality adjustment section 11 converts the RGB image data into CMY image data complementary to the RGB image data. It should be noted here that the conversion of the RGB data into the CMY image data in the single-color mode is executed by using Eq. (1) below, where the coefficients r1 to r3 are defined based on [Table 1]. For example, in cases where the user selects cyan as his/her desired color in the single-color mode, the values of r1 to r3 in the column "Cyan" are referred to, with the result that r1=1, r2=0, and r3=0 are selected.

TABLE 1

$$\begin{pmatrix} C \\ M \\ Y \end{pmatrix} = \begin{pmatrix} r1 \cdot a1 & r1 \cdot a2 & r1 \cdot a3 \\ r2 \cdot a1 & r2 \cdot a2 & r2 \cdot a3 \\ r3 \cdot a1 & r3 \cdot a2 & r3 \cdot a3 \end{pmatrix} \times \begin{pmatrix} R \\ G \\ B \end{pmatrix} + \begin{pmatrix} r1 \cdot c \\ r2 \cdot c \\ r3 \cdot c \end{pmatrix} \quad \text{Eq. (1)}$$

a1 = −0.23046675 a2 = −0.79296875 a3 = 0.0234375 c = 255

| Adjustment Plane | Output Color (Single Color) | | | | | |
|---|---|---|---|---|---|---|
| | Red | Green | Blue | Cyan | Magenta | Yellow |
| r1 | 0 | 1 | 1 | 1 | 0 | 0 |
| r2 | 1 | 0 | 1 | 0 | 1 | 0 |
| r3 | 1 | 1 | 0 | 0 | 0 | 1 |

Figure 2:
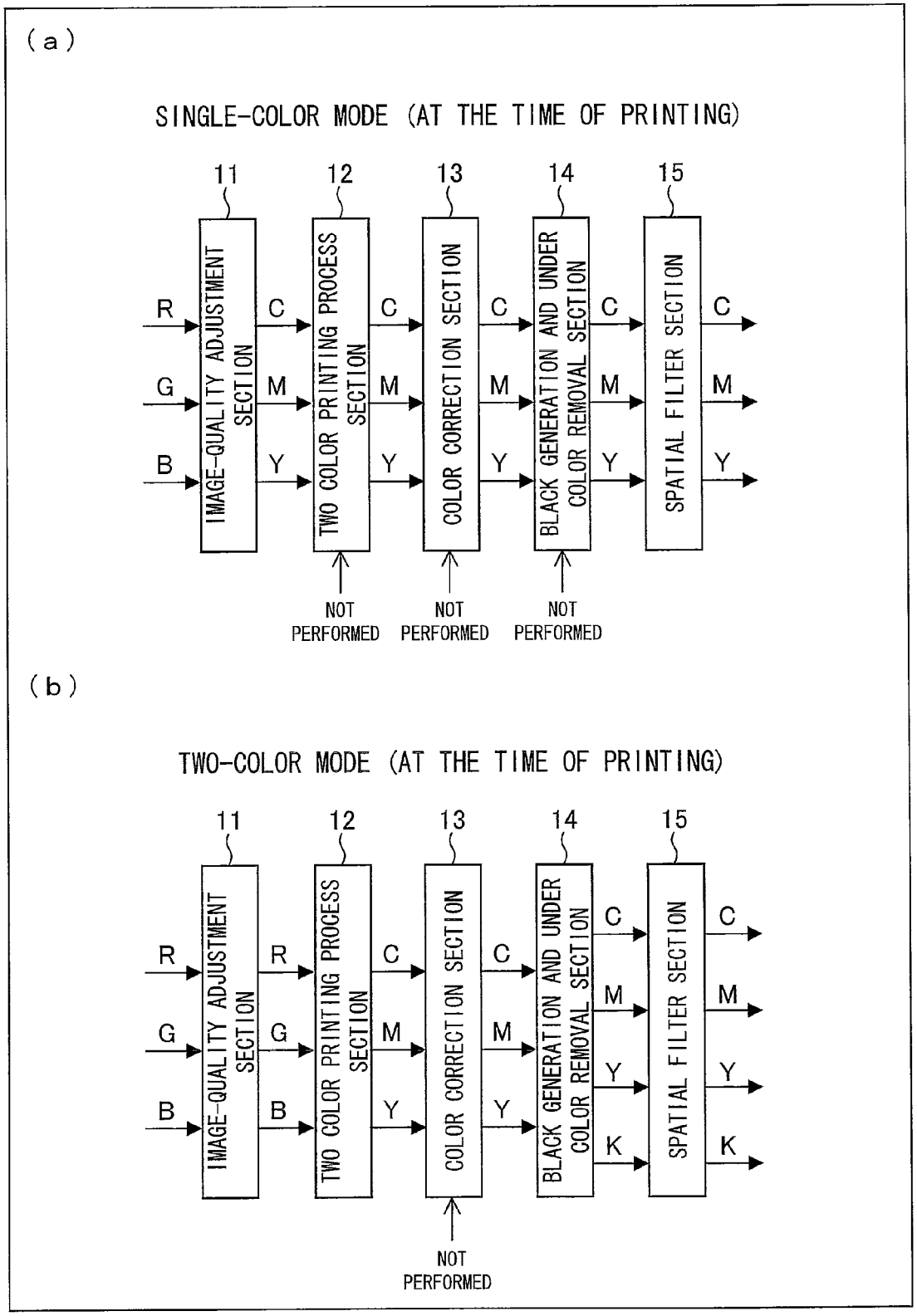
FIG. 2 shows block diagrams showing a part inside of an image processing apparatus (a) performing a printing process in the copier mode and a single-color mode and (b) performing a printing process in the copier mode and a two-color mode.

That is, whereas the output from the image-quality adjustment section 11 in the full-color mode is RGB image data as shown in FIG. 1, the output from the image-quality adjustment section 11 in the single-color mode is CMY image data as shown in (a) of FIG. 2. It should be noted that the output from the image-quality adjustment section 11 in the two-color mode is RGB image data as shown in (b) of FIG. 2. (a) of FIG. 2 shows some of the blocks of the image processing apparatus 102 performing a printing process in the copier mode and the single-color mode, and (b) of FIG. 2 shows some of the blocks of the image processing apparatus 102 performing a printing process in the copier mode and the two-color mode.

Further, the adjustment of intensity by the image-quality adjustment section 11 can be realized by using the matrix of Eq. (1) after varying the values of r1 to r3 and a1 to a3 of the matrix. This makes it possible to use the same matrix and the same image processing circuit for the adjustment of intensity and the conversion of image data (from RGB into CMY) in the single-color mode. Therefore, in the present embodiment, the adjustment of intensity and the conversion of image data in the single-color mode are performed by the same processing section (image-quality adjustment section 11).

The two-color printing process section 12 is a block that, in the two color mode, receives RGB image data from the image-quality adjustment section 11 and converts the RGB image into CMY image data as shown in (b) of FIG. 2. The conversion of the RGB image data into the CMY image data in the two-color mode can be realized, for example, by a technique of [Embodiment 1] or [Embodiment 2] described in Japanese Patent Application Publication, Tokukai, No. 2007-28336 A.

Further, in the full-color mode, as shown in FIG. 1, the two-color printing process section 12 performs no processing on the image data sent from the image-quality adjustment section 11 and passes the image data directly on to the color correction section 13. Furthermore, in the single-color mode, as shown in (a) of FIG. 2, two-color printing process section 12 performs no processing on the CMY image data sent from the image-quality adjustment section 11 and passes the image data directly on to the color correction section 13.

The color correction section 13 is a block that, in the full-color mode, receives RGB image data from the two-color printing process section 12, performs a color correction process of converting the RGB image data into CMY image data, and performs a process of improving the color reproducibility of the image data. The color correction process is realized by creating an LUT (look-up table) of input values (RGB) and output values (CMY) associated with one another and looking up the output values in the created LUT.

Further, in the single-color mode or two-color mode, as shown in FIG. 2, the color correction section 13 performs no processing on the CMY image data sent from the two-color printing process section 12 and passes the image data directly on to the black generation and under color removal section 14.

The black generation and under color removal section 14 is a block that, in the full-color mode or two-color mode, receives CMY image data from the color correction section 13, generates black (K) image data from the CMY image data, and generate new CMY image data by subtracting the black (K) image data from the original CMY image data. Thus, in the full-color mode or two-color mode, as shown in FIG. 1 or (b) of FIG. 2, the black generation and under color removal section 14 converts the CMY image data into four colors of image data CMYK.

Further, in the single-color mode, as shown in (a) of FIG. 2, the black generation and under color removal section 14 performs no processing on the CMY image data sent from the color correction section 13 and passes the image data directly on to the subsequent spatial filter section 15.

In the full-color mode or two-color mode, the output from the black generation and under color removal section 14 and the input to and output from each block subsequent to the black generation and under color removal section 14 are CMYK image data as shown in FIG. 1. Meanwhile, in the single-color mode, the output from the black generation and under color removal section 14 and the input to and output from each block subsequent to the black generation and under color removal section 14 are CMY image data unlike in FIG. 1.

The spatial filter section 15 receives the CMYK or CMY image data from the black generation and under color removal section 14 and performs a spatial filter process (e.g., edge enhancement process, smoothing process) on the image data by a digital filter in accordance with the segmentation class signals. That is, the spatial filter section 15 executes image processing differently for each image area in accordance with the segmentation class signals.

The enlarging/reducing section 16 is a block that enlarges or reduces an image in accordance with an enlarging/reducing command (information indicating the zoom ratio of a printed image) inputted by the user from the operation panel (not shown).

The output tone correction section 17 is a block that receives image data from the enlarging/reducing section 16 and performs output gamma correction for outputting the image data onto a recording medium such as a sheet of paper. The halftone generation section 18 executes, by dithering or error diffusion, a tone reproduction process (halftone generation process) necessary for the image output apparatus 103 to print an image.

Then, the halftone generation section 18 passes the CMYK or CMY image data on to the image output apparatus 103, and the image output apparatus 103 prints an image of the image data onto a recording medium (e.g., a sheet of paper).

(1-2) Preview Display

Figure 3:
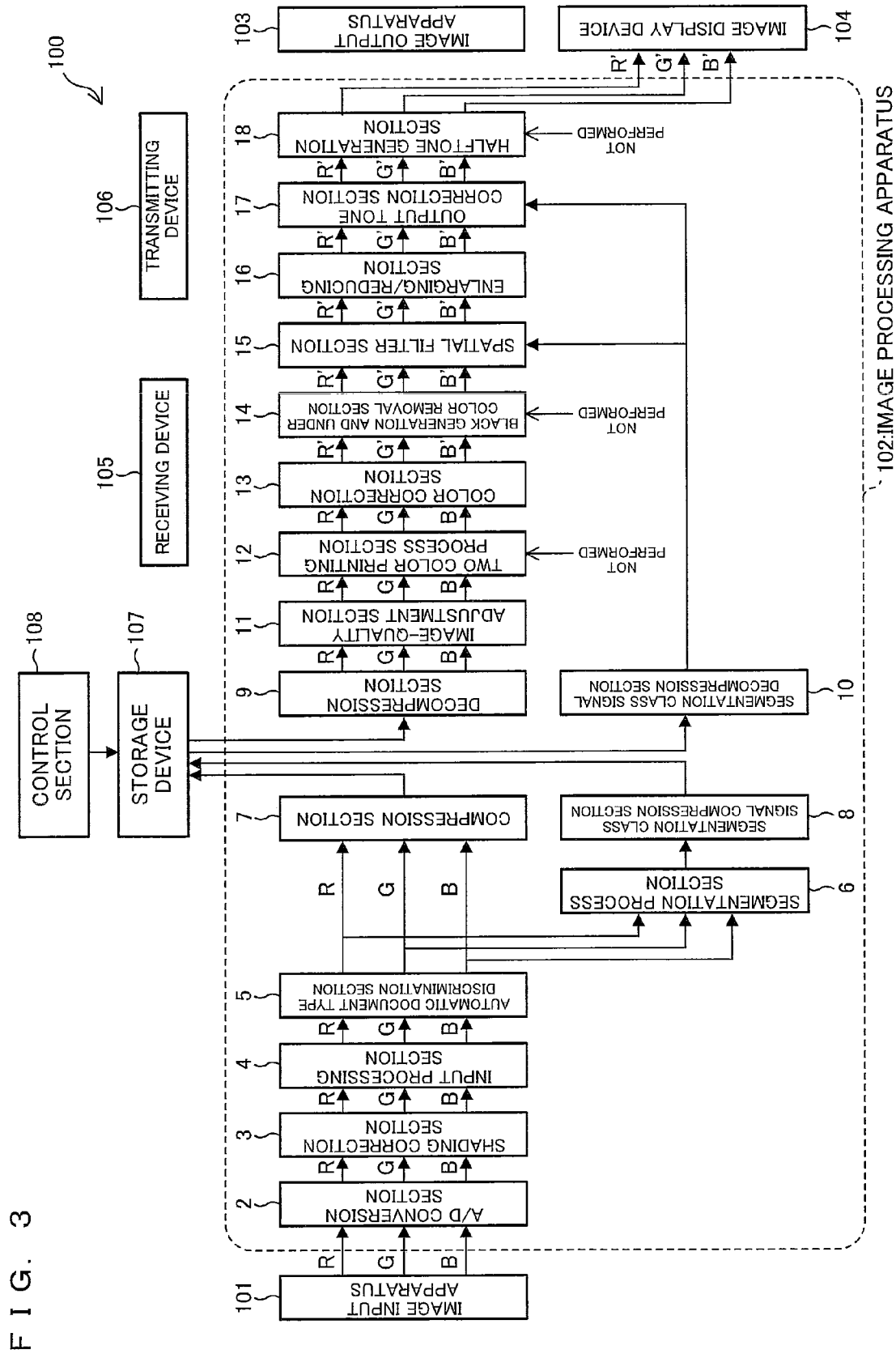
FIG. 3 is a block diagram showing the image forming apparatus of the present embodiment and showing the flow of image data in a preview display process in the copier mode and the full-color mode.

Next, the processes that are executed by the blocks of the image processing apparatus 102 in cases where a preview of an image to be printed is displayed in the copier mode are described with reference to FIG. 3. FIG. 3 is a block diagram showing the same image forming apparatus 100 as in FIG. 1 and showing the flow of image data at the time of a preview display process in the copier mode and the full-color mode.

It should be noted that because the A/D (analog/digital) conversion section 2, the shading correction section 3, the input processing section 4, the automatic document type discrimination section 5, the segmentation process section 6, the compression section 7, the segmentation class signal compression section 8, the decompression section 9, the image-quality adjustment section 11, and the two-color printing process section 12 perform the same processes as in the case of a printing process, such processes will not be described below.

At the time of a preview display, as shown in FIG. 3, the segmentation class signal decompression section 10 decompresses (decodes) segmentation class signals and passes them on to the spatial filter section 15 and the output tone correction section 17.

In the full-color mode, the color correction section 13 receives RGB image data in color space of the scanner (image input apparatus 101). Then, the color correction section 13 converts the RGB image data into R'G'B' image data in color space of the image display device 104.

That is, the color correction section 13 converts the RGB image data, which conform to the image scanning characteristics of the scanner, into the R'G'B' image data, which conform to the display characteristics of the display device. It should be noted that the conversion of the RGB image data into the R'G'B' image data is also realized by creating an LUT (look-up table) of input values (RGB) and output values (R'G'B') associated with one another and looking up the output values in the created LUT.

Moreover, in the full-color mode, the present embodiment uses the same image processing circuit for the conversion of RGB image data into CMYK image data at the time of a printing process and the conversion of RGB image data into R'G'B' image data at the time of a preview display.

Figure 4:
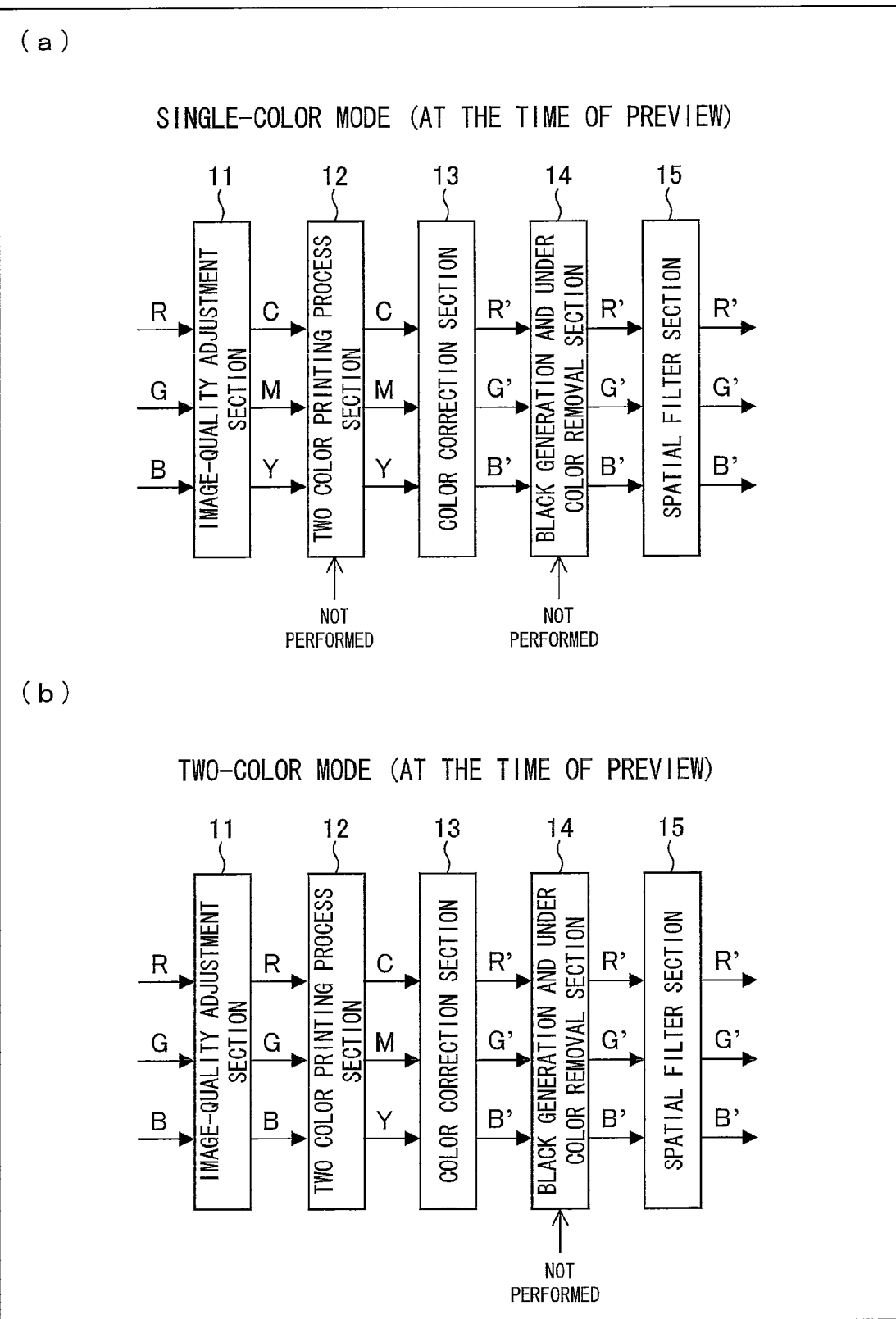
FIG. 4 shows block diagrams showing a part inside of the image processing apparatus (a) performing a preview display in the copier mode and the singe-color mode and (b) performing a preview display in the copier mode and the two-color mode.

As with FIG. 1, FIG. 3 shows the image forming apparatus 100 in the full-color mode. In the full-color mode, the color correction section 13 receives RGB image data. Meanwhile, in the single-color mode or two-color mode, as shown in FIG. 4, the color correction section 13 receives CMY image data. (a) of FIG. 4 shows some blocks of the image processing apparatus 2 performing a preview display in the copier mode and the singe-color mode, and (b) of FIG. 4 shows some blocks of the image processing apparatus performing a preview display in the copier mode and the two-color mode.

Then, in the single-color mode or two-color mode, the color correction section 13 converts the CMY image data into R'G'B' image data. That is, the color correction section 13 converts the CMY image data, which conform to the printing characteristics of the printing process, into the R'G'B' image data, which conform to the display characteristics of the display device. It should be noted that the conversion of the CMY image data into the R'G'B' image data is also realized by creating an LUT (look-up table) of input values (RGB) and output values (R'G'B') associated with one another and looking up the output values in the created LUT.

In any one of the single-color mode, the two-color mode, and the full-color mode, as shown in FIGS. 3 and 4, the black generation and under color removal section 14 performs no processing on the R'G'B' image data sent from the color correction section 13 and passes the image data directly on to the subsequent spatial filter section 15.

The spatial filter section 15 receives the R'G'B' image data from the black generation and under color removal section 14 and performs a spatial filter process (e.g., edge enhancement process, smoothing process) on the image data by a digital filter in accordance with the segmentation class signals. That is, as in the case of a printing process, the spatial filter section 15 executes image processing differently for each image area in accordance with the segmentation class signals.

The enlarging/reducing section 16 performs a downsampling process by which the number of pixels of an image composed of the R'G'B' image data sent from the spatial filter section 15 is converted into the number of pixels of the image display device 104 (process by which the number of pixels is reduced). The image display device 104, provided in the operation panel of the image forming apparatus 100, is lower in resolution than image data to be printed and, usually, is an extremely small display. Therefore, at the time of a preview display, it is necessary to downsample the image data. Further, the enlarging/reducing section 16 enlarges or reduces the image in accordance with an enlarging/reducing command (information indicating the zoom ratio of a display, e.g., a fixed zoom ratio of 2 to 4 times) inputted from the operation panel (not illustrated) provided in the image forming apparatus.

Figure 5:
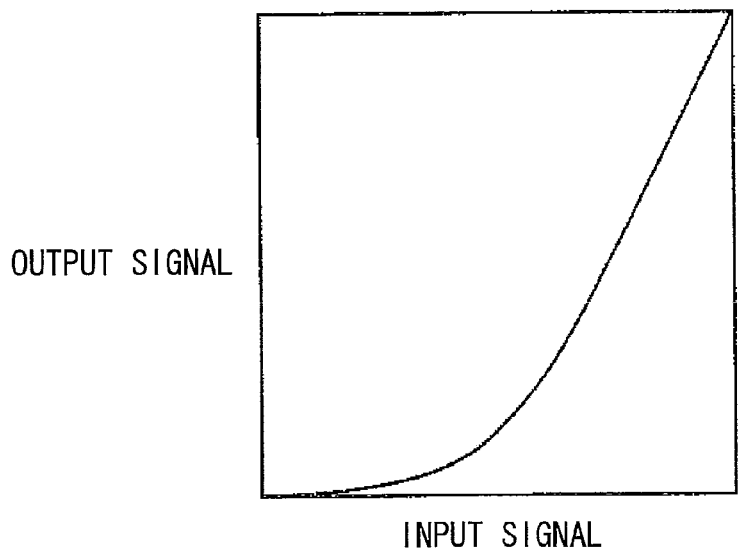
FIG. 5 shows gamma curves, i.e., (a) an example of a gamma curve corresponding to the display characteristics of an image display device and (b) a solid line representing a gamma curve for texts to be sharply displayed and a dotted line representing a gamma curve corresponding to the display characteristics of the image display device.
Figure 5:
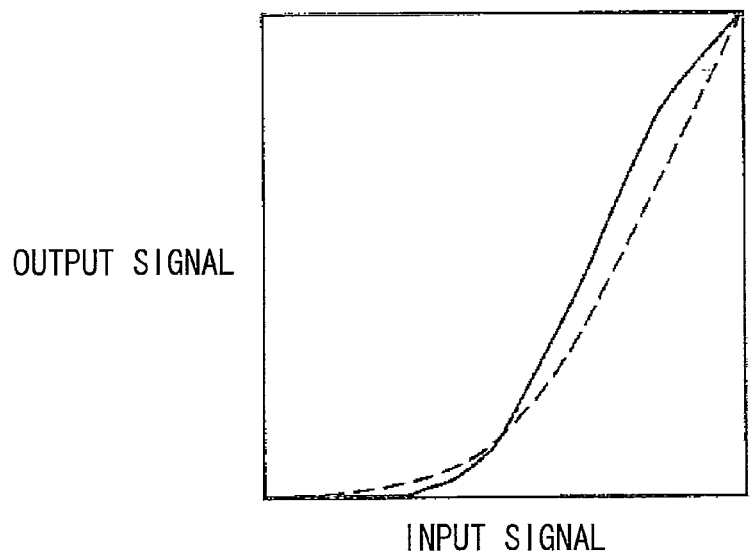

The output tone correction section 17 receives the image data from the enlarging/reducing section 16 and performs output gamma correction on the image data in accordance with the segmentation class signals. More specifically, in accordance with the segmentation class signals, the output tone correction section 17 selects different gamma curves for different image areas and varies in output gamma correction from one image area to another. For example, for nontext areas, the output tone correction section 17 selects a gamma curve corresponding to the display characteristics of the image display device 104, and for text areas, selects a gamma curve for texts to be sharply displayed. (a) of FIG. 5 shows a gamma curve corresponding to the display characteristics of the image display device 104, and (b) of FIG. 5 shows a solid line representing a gamma curve for texts to be sharply displayed and a dotted line representing a gamma curve corresponding to the display characteristics of the image display device 14. The dotted line is shown for comparison with the gamma curve for texts to be sharply displayed.

In the present embodiment, the output tone correction section 17 selects between the gamma curves in accordance with the segmentation class signals. However, the output tone correction section 17 may perform output tone correction by using only the gamma curve of (a) of FIG. 5, instead of making selection in accordance with the segmentation class signals.

Then, the halftone generation section 18 performs no processing on the R'G'B' image data sent from the output tone correction section 17 and passes the image data directly on to the subsequent image display device 104. This allows the image display device 104 to display, in accordance with the R'G'B' image data, a preview of an image to be copied.

It should be noted that in place of the output tone correction section 17, the image-quality adjustment section 11 may execute output gamma correction.

(1-3) As to Whether the Blocks Operate or do not Operate

As described above, at the time of printing in the full-color mode, the image-quality adjustment section 11 through the halftone generation section 18 all operate except for the two-color printing process section 12 (see FIG. 1). Meanwhile, at the time of a preview display in the full-color mode, the image-quality adjustment section 11 through the halftone generation section 18 all operate except for the two-color printing process section 12, the black generation and under color removal section 14, and the halftone generation section 18 (see FIG. 3).

Further, at the time of printing in the two-color mode, the image-quality adjustment section 11 through the halftone generation section 18 all operate except for the color correction section 13 (see (b) of FIG. 2). Meanwhile, at the time of a preview display in the two-color mode, the image-quality adjustment section 11 through the halftone generation section 18 all operate except for the black generation and under color removal section 14 and the halftone generation section 18 (see (b) of FIG. 4).

Furthermore, at the time of printing in the single-color mode, the image-quality adjustment section 11 through the halftone generation section 18 all operate except for the two-color printing process section 12, the color correction section 13, and the black generation and under color removal section 14 (see (a) of FIG. 2). Meanwhile, at the time of a preview display in the single-color mode, the image-quality adjustment section 11 through the halftone generation section 18 all operate except for the two-color printing process section 12, the black generation and under color removal section 14, and the halftone generation section 18 (see (a) of FIG. 4).

(1-4) Steps of a Process

Figure 6:
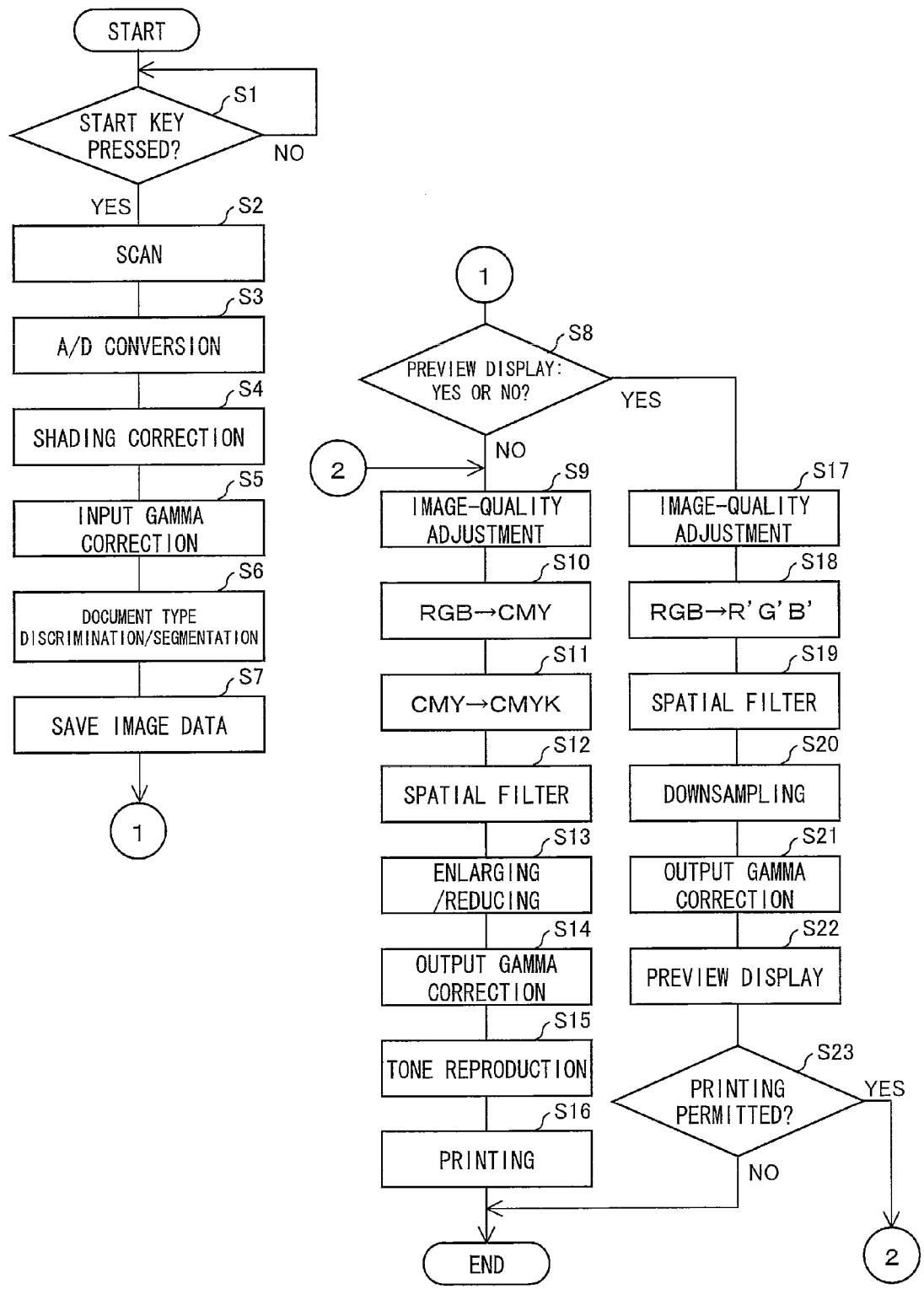
FIG. 6 is a flow chart showing steps of a process that is performed by the image forming apparatus in the copier mode and the full-color mode.

Next, an example of steps of a process in the copier mode and the full-color mode is described with reference to FIG. 6. FIG. 6 is a flow chart showing an example of steps of a process that is performed by the image forming apparatus in the copier mode and the full-color mode.

In response to a pressing of a start key (YES in S1) in the copier mode, the image forming apparatus 100 generates RGB analog signals by scanning a document (S2). It is assumed here that prior to the pressing of the start key in S1, the user inputs setting information indicating whether or not a preview display is necessary and thereby sets whether or not the image forming apparatus 100 performs a preview display.

After S2, the image forming apparatus 100 converts the RGB analog signals into RGB image data (digital data) (S3), subjects the RGB image data to shading correction (S4), and then subjects the RGB image data to input gamma correction (S5). After S5, the image forming apparatus 100 performs a document type discrimination process and a segmentation process in accordance with the RGB image data (S6), and then stores the RGB image in the storage device 107 (S7).

After S7, the image forming apparatus 100 judges whether or not it has been set to "Preview Display: Yes" (S8). In cases where it has not been set to "Preview Display: Yes", the image forming apparatus 100 executes Steps S9 through S16. In cases where it has been set to "Preview Display: Yes", the image forming apparatus 100 executes Steps S17 through S23. In the following, Steps S9 through S16 are described first, and then Steps S17 through S23 are described.

In cases where the image forming apparatus 100 has not been set to "Preview Display: Yes" (NO in S8), the image forming apparatus 100 reads out the RGB image data from the storage device 107, and then performs an image-quality adjustment process such as background removal correction and adjustment of intensity (S9). After that, the image forming apparatus 100 converts the RGB image data, which conforms to the characteristics of the scanner, into CMY image data conforming to the characteristics of the printer (S10), and then converts the CMY image data into CMYK image data (S11). After that, the image forming apparatus 100 performs a spatial filter process on the CMYK image data in accordance with a result of the segmentation process (S12), and then performs an enlarging/reducing process on the CMYK image data (S13). After S13, the image forming apparatus 100 performs output gamma correction and a tone reproduction process on the CMYK image data (S14, S15), prints an image of the image data on a sheet of paper (S16), and then finishes the process.

In cases where the image forming apparatus 100 judges, in S8, that it has been set to "Preview Display: Yes" (YES in S8), the image forming apparatus 100 reads out the RGB image data from the storage device 107, and then performs the same image-quality adjustment process as in S9 (S17). After that, the image forming apparatus 100 converts the RGB image data, which conforms to the characteristics of the scanner, into R'G'B' image data conforming to the characteristics of the display device (S18). After S18, the image forming apparatus 100 performs a spatial filter process on the R'G'B' image data in accordance with a result of the segmentation process (S19), and then performs a downsampling process on the R'G'B' image data so that the R'G'B' image data conforms to the resolution and size of the display (S20). After S20, the image forming apparatus 100 performs output gamma correction on the R'G'B' image data in accordance with the result of the segmentation process (S21). After S21, the image forming apparatus 100 performs a preview display in accordance with the R'G'B' image data (S22). Then, after S22, upon receiving, from the user, a command indicating permission of printing (YES in S23), the image forming apparatus 100 again reads out the RGB image data from the storage device 107, and then performs printing by executing Steps S9 through S16 in accordance with the image data. On the other hand, after S22, upon receiving, from the user, a command indicating cancellation of printing (NO in S23), the image forming apparatus 100 finishes the process.

(2) Facsimile Transmission Mode (2-1) Transmission Process (Image Transmission Job)

Figure 7:
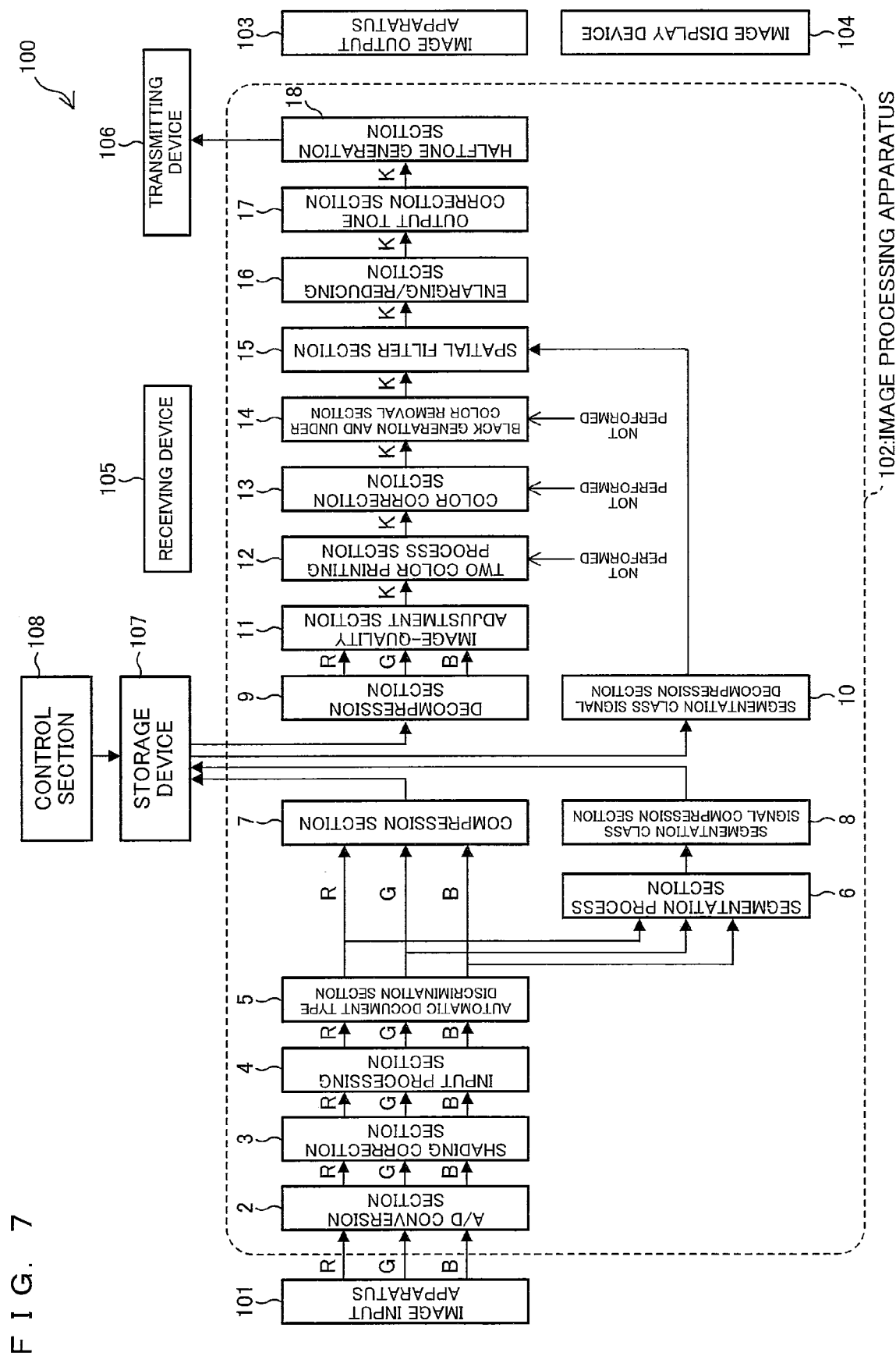
FIG. 7 is a block diagram showing the image forming apparatus of the present embodiment and showing the flow of image data in a transmission process in a facsimile transmission mode.

FIG. 7 is a block diagram showing the same image forming apparatus 100 as in FIG. 1 and showing the flow of image data in a transmission process in the facsimile transmission mode. It should be noted that because the A/D (analog/digital) conversion section 2, the shading process section 3, the input processing section 4, the automatic document type discrimination section 5, the segmentation process section 6, the compression section 7, the segmentation class signal compression section 8, and the decompression section 9 performs the same processes as in the case of the copier mode, such processes will not be described below.

In the facsimile transmission mode, the segmentation class signal decompression section 10 reads out the segmentation class signal codes from the storage device 107, decompresses the segmentation class signal codes, and then transmits the decompressed (decoded) segmentation class signal codes to the spatial filter section 15.

The image-quality adjustment section 11 receives the RGB image data from the decompression section 9 and converts the RGB image into K image data (a value indicating grayscale). It should be noted that this conversion is performed by using a predetermined matrix of coefficients and Eq. (2) below:

$$\text{Luminance (Value of } K \text{ Image Data)} = 0.299r + 0.587g + 0.114b \quad \text{Eq. (2)}$$

where r is the value (density) of red image data, g is the value of green image data, and b is the value of blue image data.

The two-color printing process section 12, the color correction section 13, and the black generation and under color removal section 14 perform no processing on the K image data (signal) sent from the image-quality adjustment section 11 and pass the K image data directly on to the subsequent spatial filter section 15.

The spatial filter section 15 performs a spatial filter process (e.g., edge enhancement process, smoothing process) on the K image data by a digital filter in accordance with the segmentation class signals. The enlarging/reducing section 16 performs an enlarging/reducing process on the K image data in accordance with the transmission resolution. The output tone correction section 17 performs output gamma correction (gamma correction for output onto a recording medium such as a sheet of paper) on the K image data sent from the enlarging/reducing section 16. The halftone generation section 18 converts the K image data into binarized image data, for example, by error diffusion. Then, the binarized image data are rotated by a rotation process section (not shown) as needed, compressed by a compression/decompression section (not shown) into a predetermined form, and then stored in a memory (not shown).

After that, the transmitting device (e.g., modem) 106 performs a procedure for transmission to the destination and ensures transmittability to the destination. Then, the transmitting device 106 reads out the binarized image data, stored in the memory, with the binarized image data compressed in the predetermined form, subjects the binarized image data to necessary processes such as a conversion in compression format, and then transmits the binarized image data in sequence via a communication line.

(2-2) Preview Display

Figure 8:
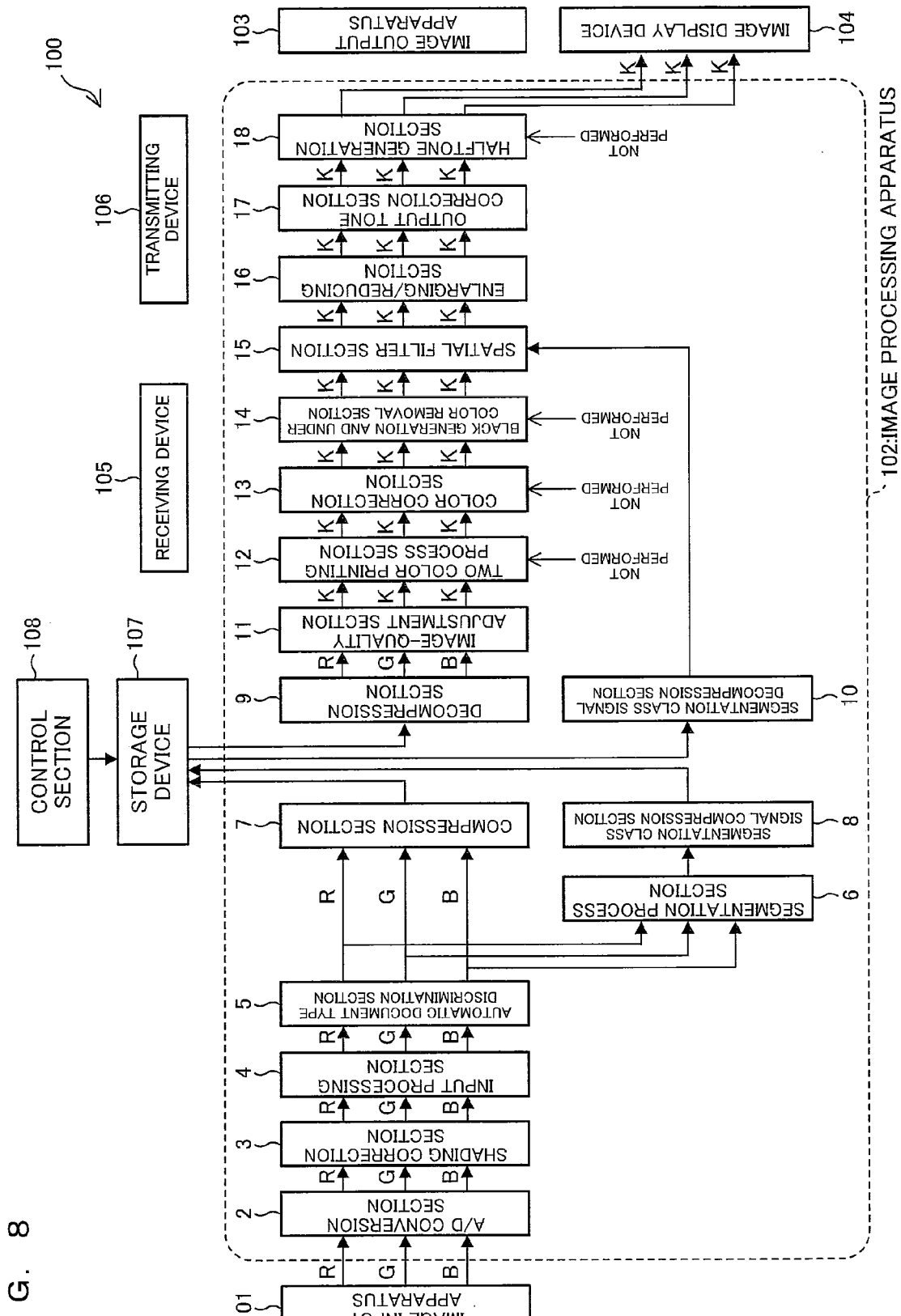
FIG. 8 is a block diagram showing the image forming apparatus of the present embodiment and showing the flow of image data in a preview display process in the facsimile transmission mode.

FIG. 8 is a block diagram showing the same image forming apparatus 100 as in FIG. 1 and showing the flow of image data in a preview display process in the facsimile transmission mode. The term "preview display in the facsimile transmission mode" here means a process of displaying a preview of an image to be transmitted by facsimile.

At the time of a preview display, the A/D conversion section 2, the shading correction section 3, the input processing section 4, the automatic document type discrimination section 5, the segmentation process section 6, the compression section 7, the segmentation class signal compression section 8, the decompression section 9, the segmentation class signal decompression section 10, the image-quality adjustment section 11, and the spatial filter section 15 perform the same processes as in the case of a facsimile transmission process; therefore, such processes are not described. Further, as in the case of a facsimile transmission process, the two-color printing process section 12, the color correction section 13, and the black generation and under color removal section 14 do not perform any processes.

However, at the time of a preview display, unlike in the case of a transmission process, as shown in FIG. 8, three pieces of K image data (all being equal in value) are transmitted for each pixel all the way from the image-quality adjustment section 11 to the image display device 104. This is because the image display device 104 is a full-color model and as such requires three values (pieces of image data) for one pixel.

The enlarging/reducing section 16 performs a downsampling process on the K image data so that the number of pixels of an image composed of the K image data sent from the spatial filter section 15 conforms to the number of pixels of the display size of the image display device 104. Further, the enlarging/reducing section 16 enlarges or reduces the image in accordance with an enlarging/reducing command (information indication the zoom ratio of a display, e.g., a fixed zoom ratio of 2 to 4 times) inputted from the operation panel (not shown) provided in the image forming apparatus 100.

The output tone correction section 17 receives the K image data from the enlarging/reducing section 16 and performs gamma correction on the K image data in conformity to the display characteristics of the image display device 104. Then, the halftone generation section 18 performs no processing on the K image data sent from the output tone correction section 17 and passes the K image data directly on to the subsequence image display device 104. This allows the image display device 104 to display, in accordance with the K image data, a preview of an image to be transmitted by facsimile.

Further, at the time of a preview display process in the facsimile transmission mode, the image-quality adjustment section 11 converts the RGB image data into three pieces of K image data. However, there is no such limitation in embodiment. For example, it is possible to perform image processing without converting RGB image data into K image data up to the output tone correction section 17, to receive the RGB image data from the output tone correction section 17, and to convert the RGB image data into K image data by a browser.

(2-3) As to Whether the Blocks Operate or do not Operate

As described above, at the time of a transmission process in the facsimile transmission mode, the image-quality adjustment section 11 through the halftone generation section 18 all operate except for the two-color printing process section 12, the color correction section 13, and the black generation and under color removal section 14 (see FIG. 7). Meanwhile, at the time of a preview display in the facsimile transmission mode, the image-quality adjustment section 11 through the halftone generation section 18 all operate except for the two-color printing process section 12, the color correction section 13, the black generation and under color removal section 14, and the halftone generation section 18 (see FIG. 8).

(2-4) Steps of a Process

Next, an example of steps of a process in the facsimile transmission mode is described. In cases where the image forming apparatus 100 receives a fax transmission command from the user with the image forming apparatus 100 having not been set to "Preview Display: Yes", the image forming apparatus 100 processes image data as shown in FIG. 7 and transmits the image data to an external apparatus.

Meanwhile, in cases where the image forming apparatus 100 receives a fax transmission command from the user with the image forming apparatus 100 set to "Preview Display: Yes", the image forming apparatus 100 processes image data as shown in FIG. 8, thereby storing the image data in the storage device 107 and displaying a preview of an image of the image data on the image display device 104. Then, when the image forming apparatus 100 receives a transmission permission command from the user with the preview being displayed, the image forming apparatus 100 reads out the image data from the storage device 107, processes the image data in the decompression section 9 through the halftone generation section 18 as shown in FIG. 7, and transmits the image data to an external apparatus via the transmitting device 106.

(3) Facsimile Reception Mode (3-1) Printing Process (Image Print Job)

Figure 9:
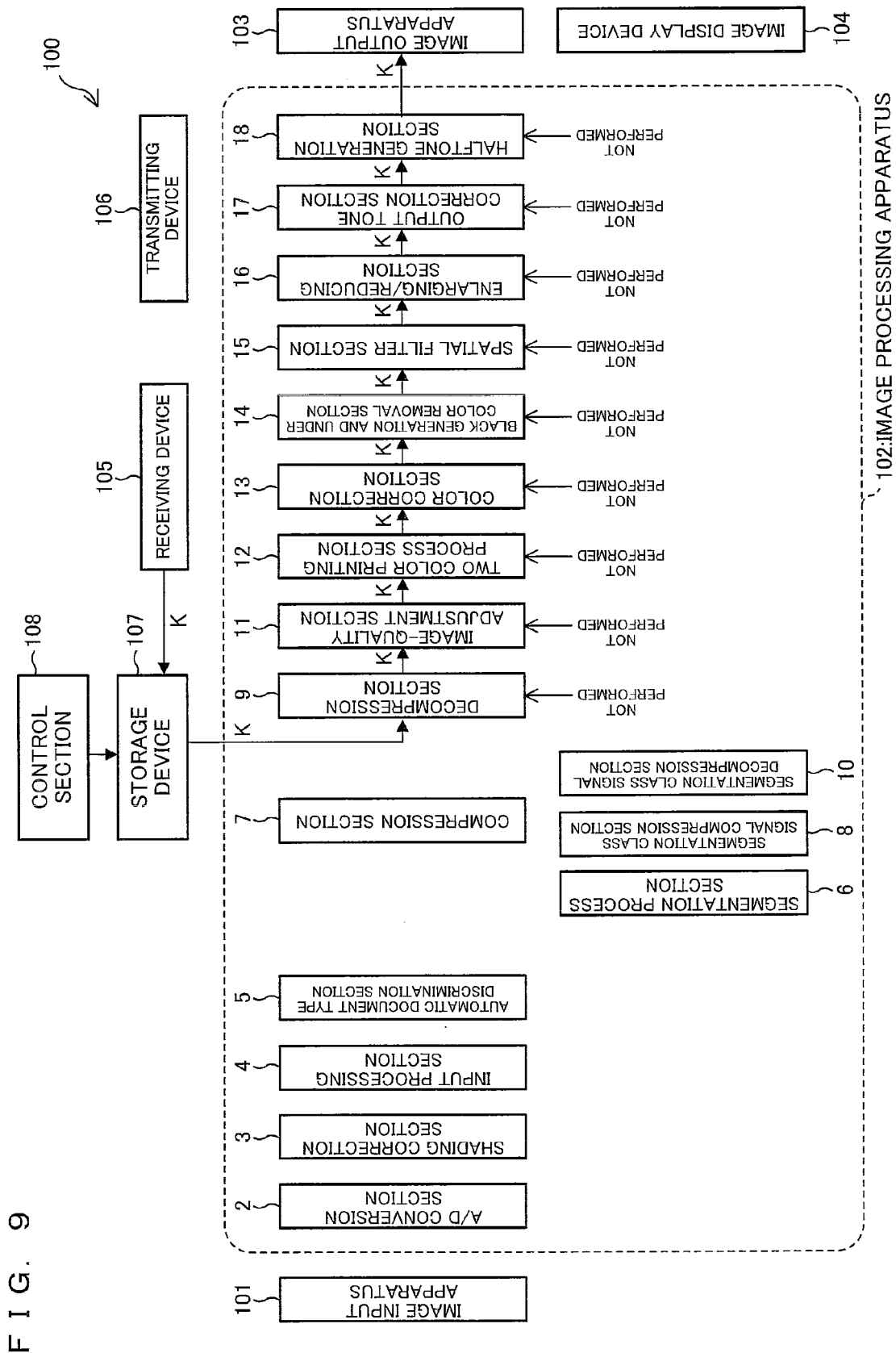
FIG. 9 is a block diagram showing the image forming apparatus of the present embodiment and showing the flow of image data in a printing process in a facsimile reception mode.

FIG. 9 is a block diagram showing the same image forming apparatus 100 as in FIG. 1 and showing the flow of image data in a printing process in the facsimile reception mode.

In the case of facsimile reception, the receiving device 105 receives K image data (1 bit) from the source while performing a communication procedure. Then, the K image data received by the receiving device 105 are decompressed by the compression/decompression section (not shown), rotated by the rotation process section (not shown) as needed, and then subjected to a resolution conversion process by a resolution conversion section (not shown). After that, the image data are stored temporarily in the storage device 107.

Furthermore, the image data written in the storage device 107 are passed on to the decompression section 9 of the image processing apparatus 102 by the control section 108. The decompression section 9, the image-quality adjustment section 11, the two-color printing process section 12, the color correction section 13, the black generation and under color removal section 14, the spatial filter section 15, the enlarging/reducing section 16, the output tone correction section 17, and the halftone generation section 18 perform no processing on the image data sent from the storage device 107 and pass the image data directly onto the subsequent image output apparatus 103. The image output apparatus 103 forms an image on a recording medium (e.g., a sheet of paper) in accordance with the K image data sent from the halftone generation section 18. In the case of a printing process in the facsimile reception mode, image processing is not performed as described above. Therefore, the image data stored in the storage device 107 may be outputted directly to the image output apparatus 103.

(3-2) Preview Display

Figure 10:
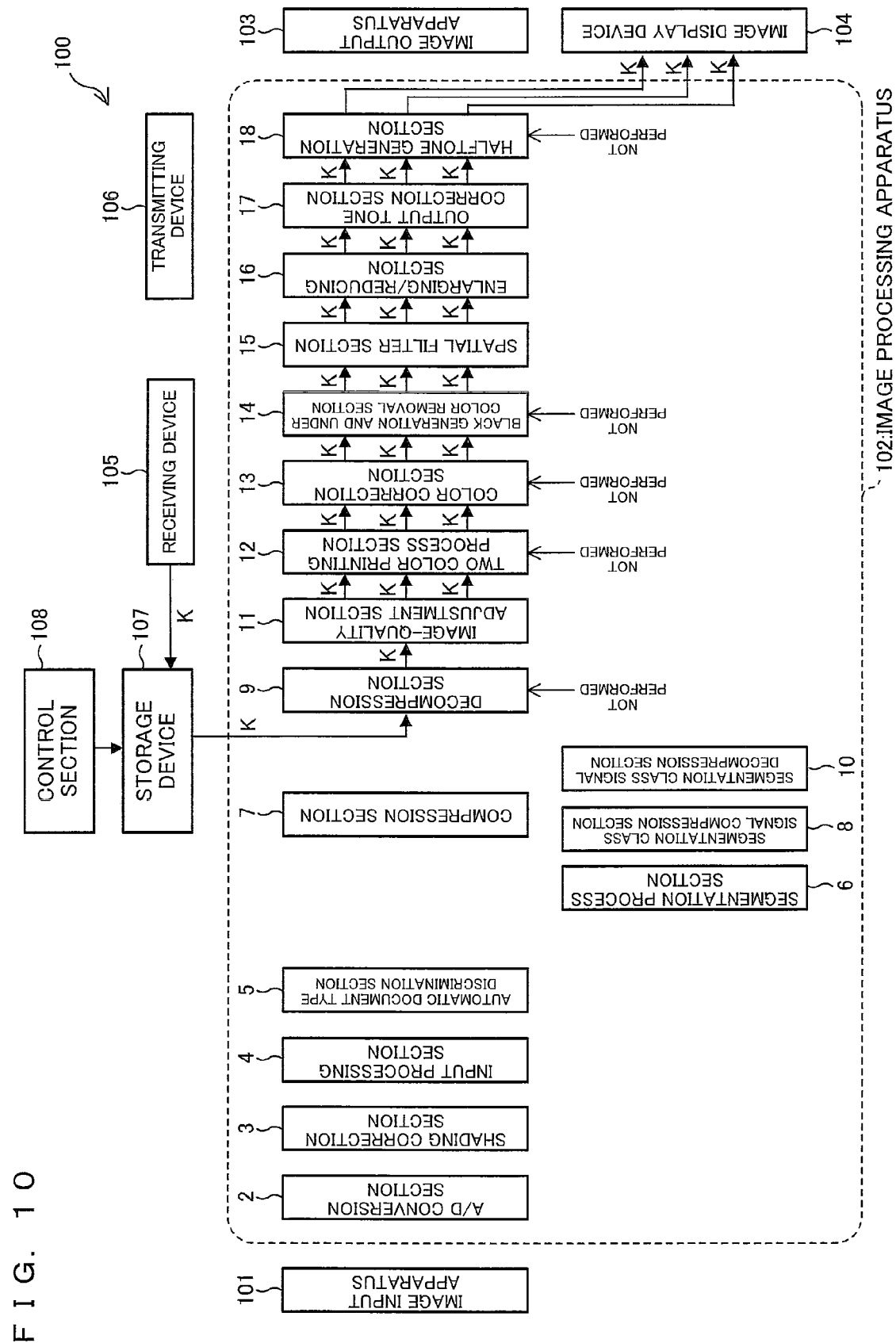
FIG. 10 is a block diagram showing the image forming apparatus of the present embodiment and showing the flow of image data in a preview display process in the facsimile reception mode.

FIG. 10 is a block diagram showing the same image forming apparatus 100 as in FIG. 1 and showing the flow of image data in a preview display process in the facsimile reception mode. The term "preview display in the facsimile reception mode" here means a process of, before printing an image of image data received by facsimile, displaying a preview of the image to be printed.

Also at the time of a preview display in the facsimile reception mode, as in the case of a printing process in the facsimile reception mode, the image data written in the storage device 107 are passed on to the decompression section 9 of the image processing apparatus 102 by the control section 108. The decompression section 9 performs no processing on the image data sent from the storage device 107 and passes the image data on to a bit-number conversion process section (not shown). Then, the bit-number conversion process section converts the number of bits of the image data sent from the decompression section 9 (e.g., from 1 bit to 8 bits), and then passes the image data on to the image-quality adjustment section 11. That is, although not shown in FIG. 10, the decompression section 9 and the image-quality adjustment section 11 has the bit-number conversion section provided therebetween.

As shown in FIG. 10, for each pixel, the image-quality adjustment section 11 receives one piece of K image data and generates and outputs three pieces of K image data (all being equal in value). This is because the image display device 104 is a full-color model and as such requires three values for one pixel.

After that, the two-color printing process section 12, the color correction section 13, and the black generation and under color removal section 14 perform no processing on the K image data sent from the image-quality adjustment section 11 and pass the image data directly on the subsequent spatial filter section 15. The spatial filter section 15 performs a blur (smoothing) process and the like on the K image data with use of a digital filter.

The enlarging/reducing section 16 performs a downsampling process on the K image data so that the number of pixels of an image of the K image data sent from the spatial filter section 15 conforms to the number of pixels of the display size of the image display device 104. Further, the enlarging/reducing section 16 enlarges or reduces the image in accordance with an enlarging/reducing command (information indication the zoom ratio of a display, e.g., a fixed zoom ratio of 2 to 4 times) inputted from the operation panel (not shown) provided in the image forming apparatus 100.

The output tone correction section 17 receives the K image data from the enlarging/reducing section 16 and performs output gamma correction on the K image data in conformity to the display characteristics of the image display device 104. Then, the halftone generation section 18 performs no processing on the K image data sent from the output tone correction section 17 and passes the K image data directly on to the subsequence image display device 104. This allows the image display device 104 to display, in accordance with the K image data, a preview of an image received by facsimile.

(3-3) As to Whether the Blocks Operate or do not Operate

As described above, at the time of a printing process in the facsimile reception mode, the image-quality adjustment section 11 through the halftone generation section 18 do not operate (see FIG. 9). Meanwhile, at the time of a preview display in the facsimile reception mode, the image-quality adjustment section 11 through the halftone generation section 18 all operate except the two-color printing process section 12, the color correction section 13, the black generation and under color removal section 14, and the halftone generation section 18 (see FIG. 10).

(3-4) Steps of a Process

Next, an example of steps of a process in the facsimile reception mode is described. In cases where the image forming apparatus 100 receives image data by facsimile, the received image data are written temporarily in the storage device 107. It should be noted here that there is a time lag between the writing of the image data in the storage device 107 and printing of an image. In cases where the user inputs a "preview command" during the time lag, the image data is processed along such a flow as shown in FIG. 10, and a preview of an image of the image data is displayed by the image display device 104. Further, when the image is printed, the image data is processed along such a flow as shown in FIG. 9, and the image of the image data is printed by the image output apparatus 103.

(4) Image Transmission Mode (4-1) Transmission Process (Image Transmission Job)

In the case of operation of the image forming apparatus 100 at the time of a transmission process in the image transmission mode, the image input apparatus 101, the A/D (analog/digital) conversion section 2, the shading correction section 3, the input processing section 4, the automatic document type discrimination section 5, the segmentation process section 6, the compression section 7, the segmentation class signal compression section 8, and the decompression section 9 performs the same processes as in the case of the copier mode. It should be noted that the segmentation class signal decompression section 10 supplies the segmentation class signals to the spatial filter section 15 and the output tone correction section 17.

Then, the image-quality adjustment section 11 performs a background removal process and color balance adjustment. The color correction section 13 converts the image data into R"G"B" image data (e.g., sRGB data) conforming to the display characteristics of a commonly-used display device. The spatial filter section 15 performs a spatial filter process (edge enhancement process, smoothing process) by a digital filter in accordance with the segmentation class signals. The enlarging/reducing section 16 enlarges or reduces the image. Further, the output tone correction section 17 performs correction on a text area with use of the gamma curve of (b) of FIG. 5, and performs correction on a nontext area with use the gamma curve of (a) of FIG. 5, for example. The two-color printing process section 12 and the black generation and under color removal section 14 perform no processing on the input image data, and each of the blocks passes the image data directly on to the subsequent block. Therefore, the output tone correction section 17 outputs the R"G"B" image data.

Furthermore, the R"G"B" image data from the output tone correction section 17 are converted into an image file such as a PDF file by a format conversion process section (not shown). Then, in the scan to e-mail mode, which is an image transmission mode, the image file is attached to an e-mail by the mail processing section (job apparatus; not shown), and the e-mail is transmitted to the destination via a network. Alternatively, in the scan to ftp mode, which is another image transmission mode, the image file is transmitted to a predetermined folder. Alternatively, in the scan to usb mode, which is the other image transmission mode, the image file is transmitted to a predetermined USB memory.

(4-2) Preview Display

In the case of operation of the image forming apparatus 100 at the time of a preview display in the image transmission mode, the image input apparatus 101, the A/D (analog/digital) conversion section 2, the shading correction section 3, the input processing section 4, the automatic document type discrimination section 5, the segmentation process section 6, the compression section 7, the segmentation class signal compression section 8, the decompression section 9, the segmentation class signal decompression section 10, the image-quality adjustment section 11, and the two-color printing process section 12 perform the same processes as in the case of transmission in the image transmission mode.

Then, at the time of a preview display in the image transmission mode, the color correction section 13 converts the RGB image data into R'G'B' image data conforming to the color space of the image display device 104.

After that, as in the case of transmission, the spatial filter section 15 performs a spatial filter process (edge enhancement process, smoothing process) by a digital filter in accordance with the segmentation class signals. The enlarging/reducing section 16 performs a downsampling process for a match in size for the image display device 104. Further, the output tone correction section 17 performs correction on a text area with use of the gamma curve of (b) of FIG. 5, and performs correction on a nontext area with use the gamma curve of (a) of FIG. 5, for example.

Then, the output tone correction section 17 supplies the R'G'B' image data to the image display device 104, and the image display device 104 performs a preview display in accordance with the R'G'B' image data.

(5) Modification

Figure 11:
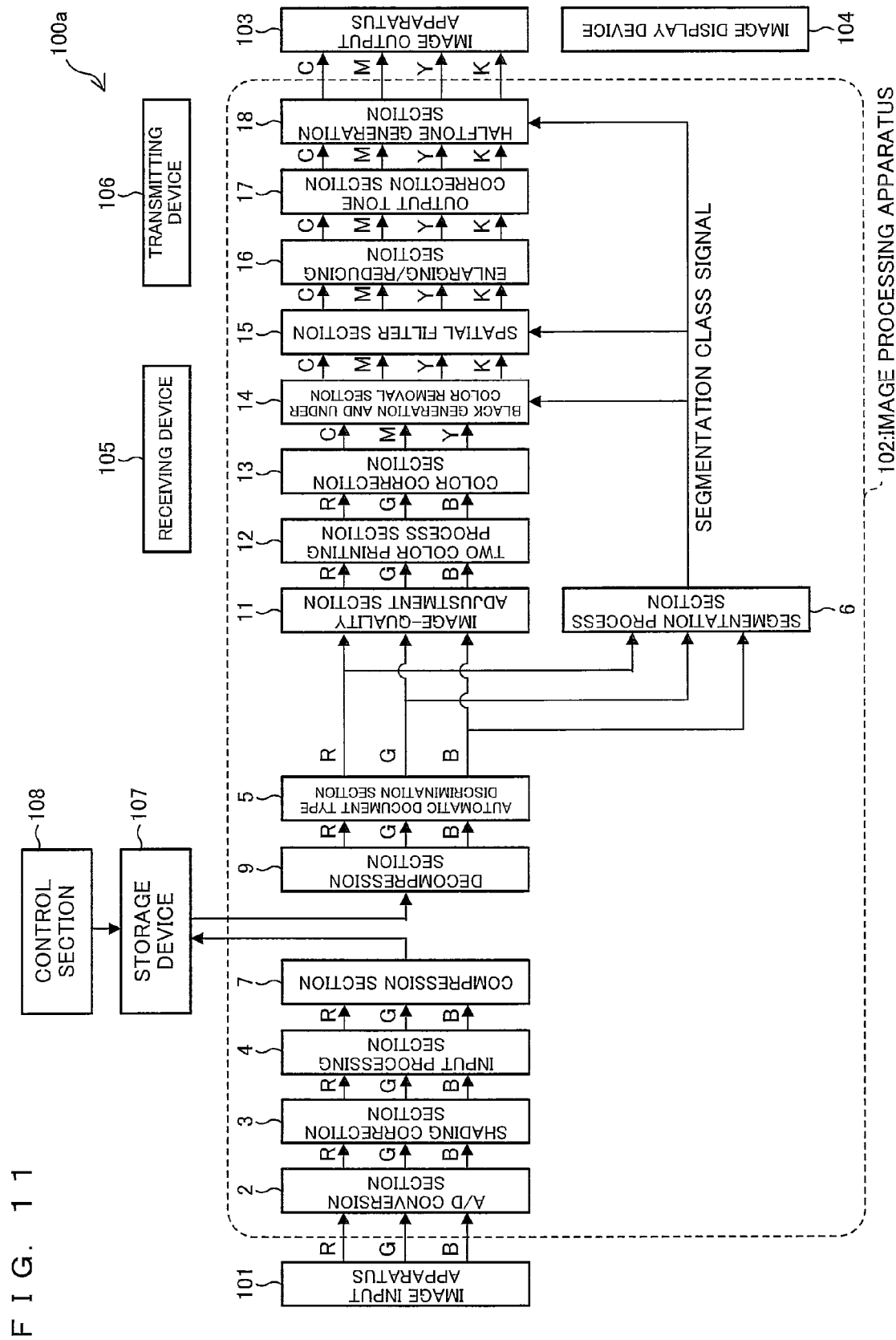
FIG. 11 is a block diagram showing a modification of the image forming apparatus of the present embodiment.

In the image forming apparatus 100 of FIG. 1, the compressed image data (encoded codes) and the segmentation class signal codes are stored in the storage device 107 in association with one another. However, as in an image forming apparatus 100a of FIG. 11, there may be such an arrangement that: after the image input apparatus 101 reads image data, the image data are encoded and stored temporarily in the storage device 107 before a segmentation process and an automatic document type discrimination process; and the image data are read out from the storage device 107, decompressed, and then subjected to a segmentation process and an automatic document type discrimination process.

Further, the image forming apparatus 100 of FIG. 1 may be capable of executing an image filing mode (image filing job) during a job such as the copier mode, the printer mode, the facsimile transmission mode, the facsimile reception mode, or the image transmission mode. The image filing mode is a mode in which to create an image file (e.g., JPEG or TIFF file), during a job such as the copier mode, in accordance with image data obtained by the image input apparatus 101 or image data received from outside and store the image file in the storage device 107.

At the time of filing in the image filing mode, the image data obtained by the image input apparatus 101 or the image data received from outside are converted into an image file (e.g., JPEG or TIFF file) by the image processing apparatus 102. The image filed is sent to a filing processing section (job apparatus; not shown). The filing processing section stores the image file in the storage device 107.

Further, in the case of a preview during each job (e.g., the copier mode, the print mode, or the facsimile transmission mode), the image data obtained by the image input apparatus 101 or the image data received from outside are processed by the image processing apparatus 102, and then sent to the image display device 104, regardless of the execution of the image filing mode. Furthermore, in the case of a preview during each job, the image processing apparatus 102 executes the same image processing regardless of the execution of the image filing mode. For example, at the time of a preview display in the copier mode, the image processing apparatus 102 performs such processes as shown in FIG. 3, regardless of the execution of the image filing mode. Further, at the time of a preview display in the facsimile transmission mode, the image processing apparatus 102 performs such processes as shown in FIG. 8, regardless of the execution of the image filing mode.

(6) Advantages of the Image Processing Apparatus of the Present Embodiment

The image processing apparatus 102 of the present embodiment supplies image data to the image output apparatus (job apparatus, printing apparatus) 103, which performs a print job (copier mode, print mode), and supplies the image data to the image display device 104 so that the image display device 104 displays a preview before the execution of the print job.

Moreover, the image processing apparatus 102 includes a first image processing section which performs first image processing on image data to be supplied to the image output apparatus 103, which performs second image processing on image data to be supplied to the image display device 104, the second image processing being different from the first image processing, and which performs the first image processing and the second image processing with use of a common circuit area. An example of the first image processing section is the color correction section 13 in the copier mode and the full-color mode. This is because the color correction section 13 uses a common circuit area for a process of conversion from RGB into CMY (first image processing) and a process of conversion from RGB into R'G'B' (second image processing).

This brings about a merit of reducing the circuit size of an image processing circuit even in an image processing apparatus that performs image processing for a printing process or the like and image processing for a preview before the printing process.

Further, in the present embodiment, at the time of printing in the copier mode and the full-color mode, the color correction section 13 performs a process by which additive image data (RGB) read by the scanner and conforming to the characteristics of the scanner are converted into subtractive image data (CMY) conforming to the characteristics of the image output apparatus 103. Meanwhile, at the time of a preview in the copier mode and the full-color mode, the color correction section 13 performs a process by which the additive image data (RGB) read by the scanner and conforming to the characteristics of the scanner are converted into additive image data (R'G'B') conforming to the characteristics of the image display device 104. That is, at the time of a preview display, the additive image data conforming to the characteristics of the scanner are converted directly into the image data conforming to the characteristics of the image display device 104. Therefore, at the time of a preview display in the copier mode and the full-color mode, the image processing apparatus 102 of the present embodiment performs a single nonlinear conversion from the RGB image data into the R'G'B' image data, but does not perform a plurality of nonlinear conversions as in the arrangement of Japanese Patent Application Publication, Tokukaihei, 9-135316 A (1997), thus making it possible to suppress accumulation of errors in conversion and suppress deterioration in color reproducibility. In Japanese Patent Application Publication, Tokukaihei, 9-135316 A (1997), a total of four conversions are performed, namely the conversion from RGB data into CMY data, the conversion from CMY data into CMYK data, the conversion from CMYK data into CMY data, and the conversion from the CMY data into RGB data, which result in accumulation of errors in conversion and deterioration in color reproducibility.

Further, at the time of a preview in the copier mode and the single-color mode or at the time of a preview in the copier mode and the two-color mode, the present embodiment performs such a nonlinear conversion, but the number of such nonlinear conversions is only two. Therefore, it is possible to better suppress deterioration in color reproducibility than in the arrangement of Japanese Patent Application Publication, Tokukaihei, 9-135316 A (1997), in which a total of four nonlinear conversions are performed.

Furthermore, in the present embodiment, at the time of printing in the copier mode and the full-color mode, the black generation and under color removal section 14 converts CMY image into CMYK image data; meanwhile, at the time of a preview display in the copier mode and the full-color mode, the black generation and under color removal section 14 performs no processing on R'G'B' and outputs R'G'B' directly. This makes it possible to simplify the circuit arrangement by using a common image data path in the image processing circuit for printing image data that needs to be converted from CMY into CMYK and preview image data that does not need to be subjected to a black generation and under color removal process.

The image processing apparatus 102 of the present embodiment can perform image processing based on a result of judgment by the automatic document type discrimination section 5, image processing based on a result of processing by the segmentation process section 6, and a background removal process. The effects of these processes are reflected in a preview image that is displayed by the image display device 104.

Embodiment 2

In single- or two-color printing, the present embodiment performs a process of reducing differences in color between an image to be previewed and an image to be actually printed. The process is detailed below. An image processing apparatus of the present embodiment is arranged in the same manner as the image processing apparatus 102 of Embodiment 1.

(1) Printing Process (1-1) Single-Color Mode

As in Embodiment 1, while the single-color mode is being used, the image-quality adjustment section (color conversion section) 11 converts image data into single-color image data (monochrome image data, converted image data) according to Eq. (1) above. It should be noted that the image-quality adjustment section 11 adjusts intensity according to Eq. (3) below. The parameters r1' to r3' and a11 to a33 are different from those used for the conversion into the single-color image data. The intensity is adjusted by changing the parameters.

$$\begin{pmatrix} R' \\ G' \\ B' \end{pmatrix} = \begin{pmatrix} r1' \cdot a11 & r1' \cdot a21 & r1' \cdot a31 \\ r2' \cdot a21 & r2' \cdot a22 & r2' \cdot a32 \\ r3' \cdot a31 & r3' \cdot a32 & r3' \cdot a33 \end{pmatrix} \times \begin{pmatrix} R \\ G \\ B \end{pmatrix} \quad \text{Eq. (3)}$$

Accordingly, it is possible to use the same image processing circuit for the adjustment of intensity and the process of conversion of the single-color image data (from RGB into CMY). Thus, the image processing apparatus 102 uses the same processing section (image-quality adjustment section 11) for the adjustment of intensity and the process of image data conversion.

The resulting single-color image data are not processed in the color correction section 13 or the black generation and under color removal section 14, and then processed in the subsequent processing sections and printed out by the image output apparatus 103.

(1-2) Two-Color Mode

As in Embodiment 1, while the two-color mode is being used, the two-color printing process section (color conversion section) 12 converts image data into two-color image data (two-color image data, converted image data). This process in the two-color printing process section 12 is detailed. The following assumes that the image processing apparatus 102 receives 8-bit (0 to 255) RGB image data (input image data), that the image processing apparatus 102 outputs 8-bit (0 to 255) CMYK image data (output image data), that the red (R) component is extracted from the input image data (RGB), and that printing is made only in red (R) and black (K).

Figure 12:
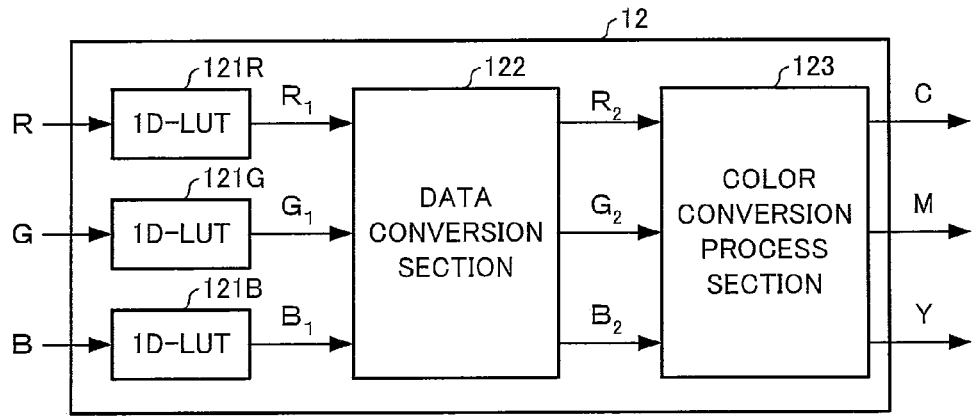
FIG. 12 is a block diagram detailing a two-color printing process section of the image forming apparatus of the present embodiment.

As shown in FIG. 12, the two-color printing process section 12 includes: one-dimensional look-up tables (1D-LUT) 121R, 121G, and 121B for converting R, G, and B, respectively; a data conversion section 122; and an arithmetic color conversion section 123.

As shown in FIG. 12, the RGB image data (RGB data) are first converted into $R_1 G_1 B_1$ image data ($R_1 G_1 B_1$ data) by the 1D-LUTs 121R, 121G, and 121B with use of the one-dimensional LUTs, respectively. Next, the $R_1 G_1 B_1$ data are inputted to the data conversion section 122. The process in the data conversion section 122 is described with reference to a flow chart shown in FIG. 13.

First, upon receiving the $R_1G_1B_1$ data (S31), the data conversion section 122 outputs the $R_1$ data (red component) of the $R_1G_1B_1$ data directly as $R_2$ data and takes the average of the $G_1$ data (green component) and the $B_1$ data (blue component) (S32).

Figure 14:
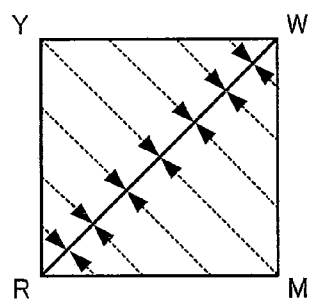
FIG. 14 shows a CMY color space, i.e., (a) a plane RYWM in the CMY color space, (b) a cross-section KRWC in the CMY color space, and (c) a perspective view of the CMY color space.
Figure 14:
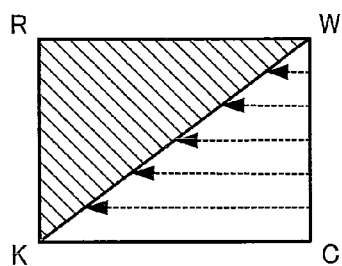
Figure 14:
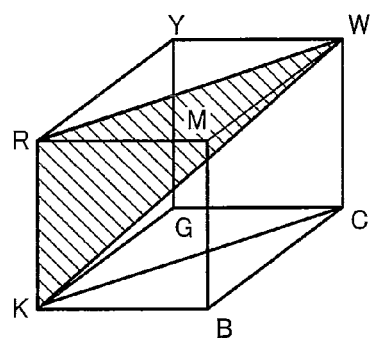

(c) of FIG. 14 represents a CMY color space. (Although the input image data are RGB data, the color space of the first color system is a CMY color space since the primary colors are CMY.) In S32 above, all the $R_1G_1B_1$ data are mapped onto the plane KRWC as shown in (a) of FIG. 14, which is an overhead view of the plane RYWM of (c) of FIG. 14. This means that all the $R_1G_1B_1$ data are mapped onto the hues R and C across the achromatic color axis (K-W).

Figure 13:
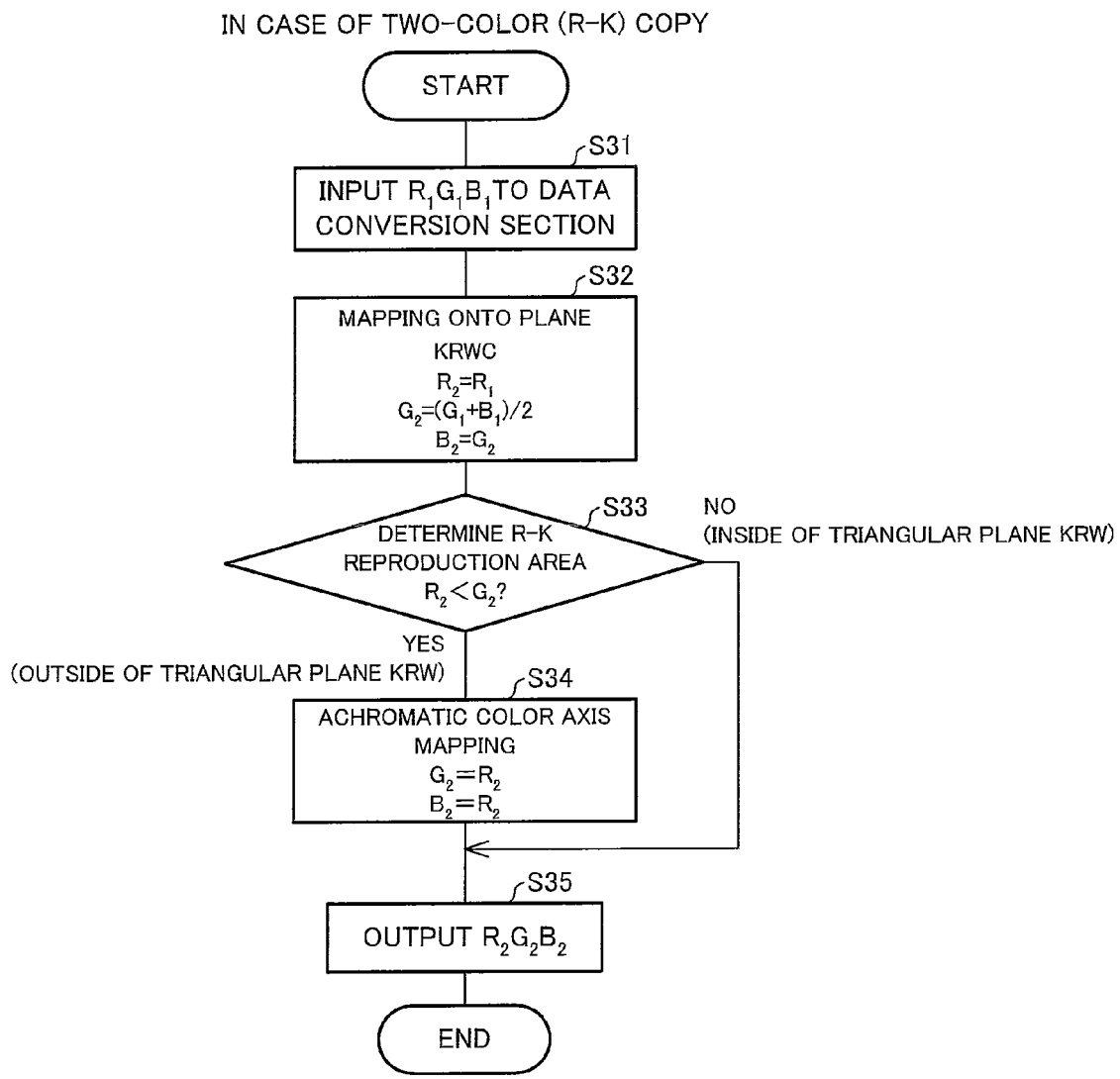
FIG. 13 is a flow chart showing a process that is performed by a data conversion section of the two-color printing process section.

Next, back in FIG. 13, the size of the $R_2$ data and the size the averaged $G_2$ (or $B_2$) data are compared with each other, whereby an R-K reproduction area is determined (S33). The determination of the R-K reproduction area is made as follows:

(1) In cases where the $G_2$ data is greater than the $R_2$ data, it is determined that the points ($R_2$, $G_2$, $B_2$) are outside of the area of the triangular plane KRW; and (2) In cases where the $G_2$ data is not greater than the $R_2$ data, it is determined that the points ($R_2$, $G_2$, $B_2$) are inside of the area of the triangular plane KRW. The triangular plane KRW is formed by connecting the achromatic color axis with the vertex R, which is one of the vertices of the CMY color space other than the achromatic color axis.

In cases where the determination (1) is made in the plane KRWC of (c) of FIG. 14 (YES in S33), the point ($R_2$, $G_2$, $B_2$), which are outside of a hatching area of (b) of FIG. 14 (i.e., outside of the area of the triangular plane KRW), are mapped onto the achromatic color axis (K-W) in parallel with RW (or KC) (S34) in the flow shown in FIG. 13. In this case, the points ($R_2$, $G_2$, $B_2$) are mapped in the direction of arrows of (b) of FIG. 14. That is, the $G_2$ data and the $B_2$ data all become identical to the $R_2$ data. After that, the $R_2G_2B_2$ data are outputted (S35).

In cases where the determination (2) is made in the plane KRWC of (c) of FIG. 14 (NO in S33), the hatching area (triangular plane KRW) is already constituted by R and K. Therefore, in the flow shown in FIG. 13, the process proceeds directly to S35, whereby the $R_2G_2B_2$ data are outputted directly. In cases where the $G_2$ data and the $R_2$ data are equal, the determinations (1) and (2) both produce the same results, whereby the points ($R_2$, $G_2$, $B_2$) are on the achromatic color axis. However, in the present embodiment, such a case is included in the determination (2).

Figure 15:
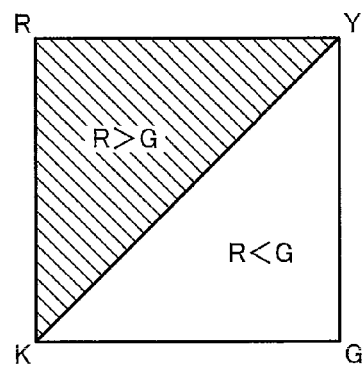
FIG. 15 shows a RGB color space, i.e., (a) a plane KRYG in the RGB color space, (b) a plane KRMB in the RGB color space, and (c) a perspective view of the RGB color space.
Figure 15:
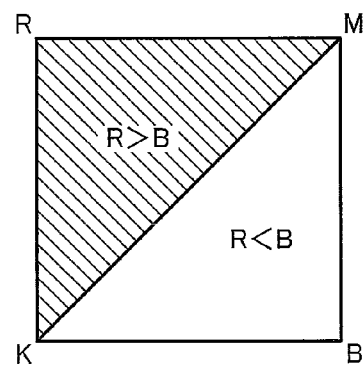
Figure 15:
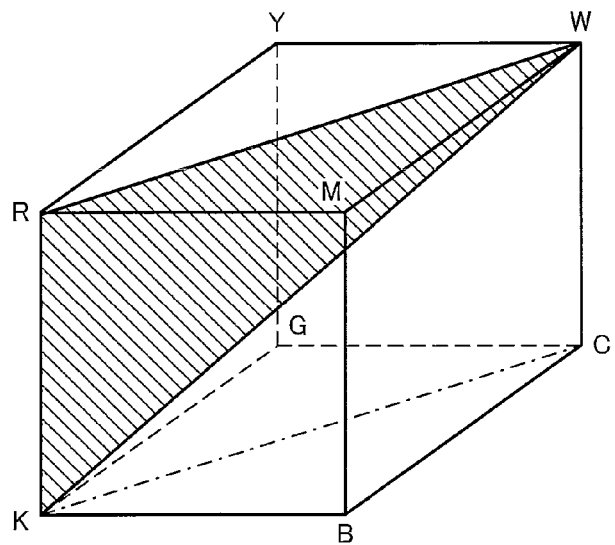

The reason why it can be determined, from the magnitude relation between the $R_2$ data and the $G_2$ data (or $B_2$ data), whether the points ($R_2$, $G_2$, $B_2$) are inside or outside of the triangular plane KRW in the plane KRWC is explained with reference to FIG. 15. (c) of FIG. 15 is a perspective view of an RGB color space. (a) of FIG. 15 shows a plane KRYG of (c) of FIG. 15. (b) of FIG. 15 shows a plane (cross-section) KRMB of (c) of FIG. 15.

First, as shown in (a) of FIG. 15, the plane KRYG is divided according to the magnitude of the R data and the G data into an area where R>G and an area where R<G. Next, as shown in (b) of FIG. 15, the plane KRMB is divided according to the magnitude of the R data and the B data into an area where R>B and an area where R<B. Accordingly, R>G and R>B in an area inside of the triangular plane KRW of (c) of FIG. 15, and R<G and R<B in an area outside of the triangular plane KRW (inside of a triangular plane KWC). As evidenced by S32 of the flow shown in FIG. 13, the $G_2$ data and the $B_2$ data always take on the same values. Therefore, it is only necessary to compare either the $G_2$ data or the $B_2$ data to the $R_2$ data in determining whether or not the points ($R_2$, $G_2$, $B_2$) are inside of the triangular plane KRW.

Finally, all the $R_1G_1B_1$ data are mapped onto the triangular plane KRW as shown in (c) of FIG. 14. This means that the mapping of the input image data onto the hatching area causes all the $R_1G_1B_1$ data to be the $R_2G_2B_2$ data, which include only a red component and a black component.

Similarly, the $R_1G_1B_1$ data can be made $R_2G_2B_2$ data including only either a green or blue component and a black component.

The arithmetic color conversion section 123 of FIG. 12 converts the $R_2G_2B_2$ data into CMY data as shown in the following equations:

$$C = 255 - R_2$$

$$M = 255 - G_2$$

$$Y = 255 - B_2$$

As explained in Embodiment 1, in the case of a printing process in the single-color mode, the color correction section 13 performs no processing. The black generation and under color removal section 14 calculates the minimum value of CMY, subtracts the minimum value from CMY, and output the minimum value as a K signal.

$$\text{MIN} = \text{Minimum Value of } CMY$$

$$C' = C - \text{MIN}$$

$$M' = M - \text{MIN}$$

$$Y' = Y - \text{MIN}$$

$$K = \text{MIN}$$

Furthermore, the processing sections subsequent to the black generation and under color removal section 14 perform processing, and the image output apparatus 103 performs printing.

(2) Preview Display (Single-Color Mode, Two-Color Mode)

In the single-color mode, the process of conversion of image data into single-color image data (CMY) by the image-quality adjustment section 11 is the same as in the case of a printing process. In the two-color mode, the process of conversion of image data into two-color image data (CMY) by the two-color printing process section 12 is the same as in the case of a printing process.

As shown in FIG. 4, at the time of a preview display in the single-color mode or two-color mode, the image data are processed by the color correction section (color matching section) 13 after being converted into single-color image data or two-color image data. This process is detailed. The color correction section 13 performs a color matching process by creating a color correction (matching) LUT of input signals (input values) and output signals (output values) associated with one another and calculating the output signals with reference to the created color correction LUT. The color correction LUT is selected from among color correction LUTs respectively dedicated to a preview display in the single-color mode and a preview display in the two-color mode according to the color selected at the time.

A color correction LUT for printing can be created by utilizing the "Color Calibration [Correction] System Using Neural Networks" described on pages 15 to 19 of *Sharp Technical Journal* No. 76 (April 2000). An input model neural network is realized by a neural network having learned the correspondence between the RGB signals, which constitute the color space of the image input apparatus 101, and the L*a*b* (CIELAB) values. An output model neural network is realized by a neural network having learned the correspondence between L*a*b* and CMY, which constitute the color space of the image output apparatus 103. By integrating these models, a color correction LUT for converting input RGB signals into output CMY signals is created.

At the time of a preview display in the single-color mode, the image-quality adjustment section 11 creates CMY signals. Alternatively, at the time of a preview display in the two-color mode, the two-color printing process section 12 creates CMY signals. Therefore, the color correction section 13 converts the CMY signals into RGB (R'G'B') signals for display in the image display device 104.

Figure 16:
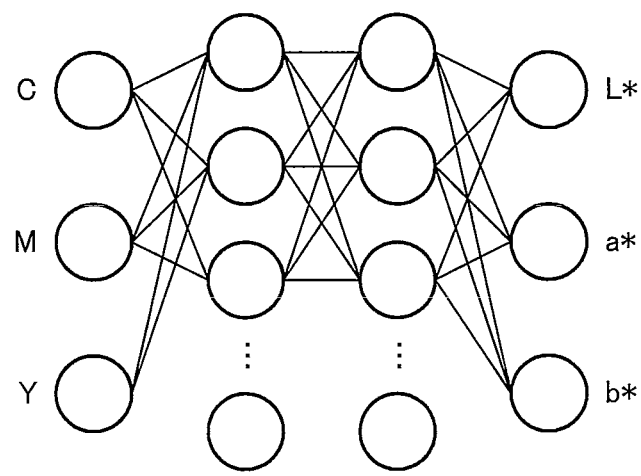
FIG. 16 shows a neural network of an input model.
Figure 17:
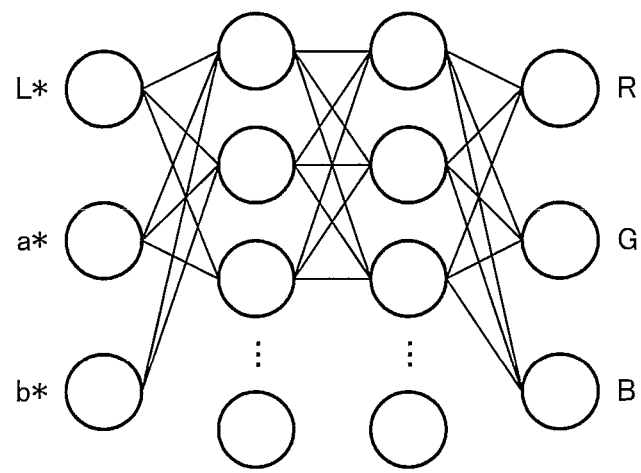
FIG. 17 shows a neural network of an output model.

In the single-color mode or two-color mode, a color correction LUT for preview display can be created in the same manner as the color correction LUT for printing. Since the color correction section 13 receives CMY signals, an input model neural network is realized by a neural network, shown in FIG. 16, which has learned the correspondence between the CMY signals, which are the color reproduction characteristics of the image output apparatus 103, and the L*a*b* (CIELAB) values. It should be noted here that the characteristics of the image output apparatus 103 are obtained from the relationship between the CMY signals and the CIE 1976 L*a*b* signals by outputting a patch from the image output apparatus 103 and measuring the colors of the patch, and then learned by the neural network. An output model neural network is realized by a neural network, shown in FIG. 17, which has learned the correspondence between L*a*b*, which are the color reproduction characteristics of the image display device 104, and RGB. Further, the characteristics of the image display device 104 are obtained from the relationship between the RGB signals and the CIE 1976 L*a*b* signals by measuring various colors displayed by the image display device 104, and then learned by the neural network. By integrating these models, the color correction LUT for preview display can be created. Use of the color correction LUT for preview display makes it possible to find the relationship between the CMY signals and the RGB signals. That is, by reading out, from the color correction LUT, values corresponding to the CMY signals to be received by the color correction section 13, the CMY signals can be converted into RGB (R'G'B') signals for display in the image display device 104.

As described above, by performing a color conversion in the color correction section 13 at the time of a preview display in the single-color mode or two-color mode, the image processing apparatus 102 can realize a preview display of an image matched in color to an image to be printed out from the image output apparatus 103 at the time of a printing process in the single-color mode or at the time of a printing process in the two-color mode, without having a separate processing circuit dedicated to previewing images.

In the case of use of the facsimile transmission mode or image transmission mode in the single-color mode or two-color mode, the process in the color correction section can be applied at the time of a preview display.

The present embodiment can be achieved by storing, in a computer-readable storage medium containing control program code (executable program, intermediate code program, or source program) to be executed by a computer, an image processing method for displaying a preview of such a single- or two-color image by reducing differences in color between an image to be previewed and an image to be actually printed. This makes it possible to provide a portable storage medium containing a program for the image processing method.

In the present embodiment, the storage medium may be a memory (not shown) for processing in a microcomputer. For example, the storage medium may be a program medium such as a ROM per se. Alternatively, the storage medium may be a program medium that can read by inserting the storage medium into a program reading device provided as an external storage device (not shown).

In either case, the contained program code may be arranged to be accessible to a microprocessor that will execute the program code. Alternatively, the program code may be arranged to be read and then downloaded to a program storage area (not shown) of the microcomputer. It is assumed that the download program is stored in advance in the main apparatus.

It should be noted here that the program medium is a storage medium arranged to be separable from the main body. The storage medium may be, for example, a tape, such as a magnetic tape or a cassette tape; a magnetic disk, such as a flexible disk or a hard disk, or an optical disk, such as CD-ROM/MO/MD/DVD; a card, such as an IC card (memory card) or an optical card; or a semiconductor memory, such as a mask ROM/EPROM (erasable programmable read-only memory)/EEPROM (electrically erasable programmable read-only memory)/flash ROM. All these storage media hold a program in a fixed manner.

Alternatively, since the present embodiment is a system configuration connectable to communication networks including the Internet, the program medium may be a medium carrying the program code in a flowing manner as in the downloading of a program over a communication network. Further, when the program code is downloaded over a communications network in this manner, the download program may be stored in advance in the main apparatus or installed from another storage medium. The present invention can be realized in the form of a computer data signal, embedded in a carrier wave, in which the program code is embodied electronically. The storage medium is read by a digital color image forming apparatus or a program reading device provided in a computer system, whereby the aforementioned image processing method is executed.

As described above, an image processing apparatus according to the present invention is an image processing apparatus, having a color conversion section for converting image data into monochrome image data, which supplies the monochrome image data to a printing apparatus for executing image printing and supplies the monochrome image data to an image display device for displaying a preview, the image processing apparatus including: a color matching section for performing, on the monochrome image data to be supplied to the image display device, a color matching process of reducing differences in color between an image to be outputted by the image display device and an image to be outputted by the printing apparatus.

As described above, an image processing apparatus according to the present invention is an image processing apparatus, having a color conversion section for converting image data into two-color image data, which supplies the two-color image data to a printing apparatus for executing image printing and supplies the two-color image data to an image display device for displaying a preview, the image processing apparatus including: a color matching section for performing, on the two-color image data to be supplied to the image display device, a color matching process of reducing differences in color between an image to be outputted by the image display device and an image to be outputted by the printing apparatus.

As described above, an image processing apparatus according to the present invention is an image processing apparatus, including a first color conversion section for converting image data into monochrome converted image data and a second color conversion section for converting the image data into two-color converted image data, which supplies, to a printing apparatus for executing image printing, the converted image data converted by the first or second color conversion section, and which supplies, to an image display device for displaying a preview, the converted image data converted by the first or second color conversion section, the image processing apparatus including: a color matching section for performing, on the converted image data to be supplied to the image display device, a color matching process of reducing differences in color between an image to be outputted by the image display device and an image to be outputted by the printing apparatus.

According to the foregoing arrangement, a monochrome image or a two-color image can be printed by supplying the monochrome image data or the two-color image data (converted image data) to the printing apparatus, and a preview of the monochrome image or the two-color image can be displayed by supplying the monochrome image data or the two-color image data to the image display device. Here, on the monochrome image data or the two-color image data to be supplied to the image display device, the color matching process of reducing differences in color between an image to be outputted by the image display device and an image to be outputted by the printing apparatus is performed. This makes it possible to display a comfortable preview of a monochrome image or a two-color image by reducing differences in color between an image to be previewed and an image to be actually printed.

In addition to the foregoing arrangement, the image processing apparatus according to the present invention may be arranged such that: the image display device displays RGB image data; the color conversion section converts RGB image data into CMY image data; and the color matching section converts the CMY image data into RGB image data in accordance with characteristics of the image processing apparatus and characteristics of the image display device.

According to the foregoing arrangement, an image whose preview is displayed by the image display device is subjected to the color matching process in accordance with the characteristics of the image processing apparatus and the characteristics of the image display device. This makes it possible to display a comfortable preview by reducing differences in color from an image to be printed.

In addition to the foregoing arrangement, the image processing apparatus according to the present invention may be arranged such that: the image display device displays RGB image data; the first and second color conversion sections convert the RGB image data into CMY image data; and the color matching section converts the CMY image data into RGB image data in accordance with characteristics of the image processing apparatus and characteristics of the image display device.

According to the foregoing arrangement, an image whose preview is displayed by the image display device is subjected to the color matching process in accordance with the characteristics of the image processing apparatus and the characteristics of the image display device. This makes it possible to display a comfortable preview by reducing differences in color from an image to be printed.

The image processing apparatus according to the present invention may be arranged to further include a color correction section for performing color correction on three or more colors of image data that are supplied to the printing apparatus, wherein the color correction section serves also as the color matching section. According to the foregoing arrangement, the color correction section, which has conventionally been provided in the image processing apparatus, is used also as the color matching section, whereby an increase in circuit size can be inhibited without the need for another circuit for performing a color matching process on the image data (monochrome image data, two-color image data, converted image data) to be supplied to the image display device.

As described above, an image forming apparatus according to the present invention includes: an image processing apparatus as set forth in any of the foregoing; a printing apparatus; and an image display device for displaying a preview. The foregoing arrangement makes it possible to provide an image forming apparatus capable of reducing differences in color of an image between image data printed in monochrome or two colors and image data whose preview is displayed by an image display device.

As described above, an image processing method according to the present invention is an image processing method including a step of converting image data into monochrome image data, a step of supplying the monochrome image data to a printing apparatus for executing image printing, and a step of supplying the monochrome image data to an image display device for displaying a preview, the image processing method including: a color matching step of performing, on the monochrome image data to be supplied to the image display device, a color matching process of reducing differences in color between an image to be outputted by the image display device and an image to be outputted by the printing apparatus.

The method, which brings about the same effect as the above image processing apparatus, makes it possible to display a comfortable preview of a monochrome image by reducing differences in color between an image to be previewed and an image to be actually printed.

As described above, an image processing method according to the present invention is an image processing method including a step of converting image data into two-color image data, a step of supplying the two-color image data to a printing apparatus for executing image printing, and a step of supplying the two-color image data to an image display device for displaying a preview, the image processing method including: a color matching step of performing, on the two-color image data to be supplied to the image display device, a color matching process of reducing differences in color between an image to be outputted by the image display device and an image to be outputted by the printing apparatus.

The method, which brings about the same effect as the above image processing apparatus, makes it possible to display a comfortable preview of a two-color image by reducing differences in color between an image to be previewed and an image to be actually printed.

An image processing method according to the present invention is an image processing method including a step of converting image data into monochrome converted image data or converting the image data into two-color converted image data, a step of supplying, to a printing apparatus for executing image printing, the converted image data converted by the first or second color conversion section, and a step of supplying, to an image display device for displaying a preview, the converted image data converted by the first or second color conversion section, the image processing method including: a color matching step of performing, on the converted image data to be supplied to the image display device, a color matching process of reducing differences in color between an image to be outputted by the image display device and an image to be outputted by the printing apparatus.

The method, which brings about the same effect as the above image processing apparatus, makes it possible to display a comfortable preview of a monochrome image or a two-color image by reducing differences in color between an image to be previewed and an image to be actually printed.

Further, an image processing apparatus of the present invention can be realized by a computer. In this case, an image processing program for realizing the image processing apparatus on a computer by causing the computer to function as each section of the image processing apparatus and a computer-readable storage medium containing the image processing program are also encompassed in the scope of the present invention.

These arrangements make it possible to realize the same effect as the image processing apparatus by causing a computer to read and execute the image processing program.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below. Further, the numerical values outside of the ranges shown in this specification are encompassed in the present invention as long as such ranges are rational ranges that do not defeat the purpose of the present invention.

INDUSTRIAL APPLICABILITY

An image processing apparatus of the present invention can be used for apparatuses for processing image data and, in particular, for multifunction printers, copying machines, printers, and facsimile machines.

The invention claimed is:

1. An image processing apparatus, having a color conversion section for converting image data into monochrome image data, which supplies the monochrome image data to a printing apparatus for executing image printing and supplies the monochrome image data to an image display device for displaying a preview, the image processing apparatus comprising:
a color matching section for performing, on the monochrome image data to be supplied to the image display device, a color matching process of reducing differences in color between an image to be outputted by the image display device and an image to be outputted by the printing apparatus; and
a color correction section for performing color correction on three or more colors of image data that are supplied to the printing apparatus,
the image display device displaying RGB image data, and
the color correction section and the color matching section being realized by a common circuit, and the image processing apparatus including no preview processing circuit for generating a preview image, and
in a case where the preview is displayed, the color conversion section converting RGB image data into CMY monochrome image data, and the color matching section converting the CMY monochrome image data into RGB monochrome image data in accordance with characteristics of the printing apparatus and characteristics of the image display device,
in a case where the image printing is executed, the color conversion section converting the RGB image data into the CMY monochrome image data, and the color correction section performing no processing on the CMY monochrome image data.

2. The image processing apparatus as set forth in claim 1, further comprising an image-quality adjustment section for performing adjustment of image quality of the image data including color balance adjustment, wherein the color conversion section and the image-quality adjustment section are realized by a common circuit, and
in a single-color mode in which the monochrome image data is outputted, the image-quality adjustment section converts the RGB image data into the CMY monochrome image data.

3. An image forming apparatus comprising:
an image processing apparatus as set forth in claim 1;
a printing apparatus; and
an image display device for displaying a preview.

4. A non-transitory computer-readable storage medium containing an image processing program for operating an image processing apparatus as set forth in claim 1, the image processing program causing a computer to function as each section of the image processing apparatus.

5. An image processing apparatus, having a color conversion section for converting image data into two-color image data, which supplies the two-color image data to a printing apparatus for executing image printing and supplies the two-color image data to an image display device for displaying a preview, the image processing apparatus comprising:
a color matching section for performing, on the two-color image data to be supplied to the image display device, a color matching process of reducing differences in color between an image to be outputted by the image display device and an image to be outputted by the printing apparatus; and
a color correction section for performing color correction on three or more colors of image data that are supplied to the printing apparatus,
the image display device displaying RGB image data, and
the color correction section and the color matching section being realized by a common circuit, and the image processing apparatus including no preview processing circuit for generating a preview image, and
in a case where the preview is displayed, the color conversion section converting RGB image data into CMY two-color image data, and the color matching section converting the CMY two-color image data into RGB two-color image data in accordance with characteristics of the printing apparatus and characteristics of the image display device,
in a case where the image printing is executed, the color conversion section converting the RGB image data into the CMY two-color image data, and the color correction section performing no processing on the CMY two-color image data.

6. An image forming apparatus comprising:
an image processing apparatus as set forth in claim 5;
a printing apparatus; and
an image display device for displaying a preview.

7. A non-transitory computer-readable storage medium containing an image processing program for operating an image processing apparatus as set forth in claim 5, the image processing program causing a computer to function as each section of the image processing apparatus.

* * * * *